(12) United States Patent
Hearley et al.

(10) Patent No.: US 7,279,222 B2
(45) Date of Patent: Oct. 9, 2007

(54) SOLID-STATE HYDROGEN STORAGE SYSTEMS

(75) Inventors: Andrew K. Hearley, Wiltshire (GB); Scott D. Redmond, San Francisco, CA (US)

(73) Assignee: Fuelsell Technologies, Inc., San Francisco, CA (US)

( * ) Notice: Subject to any disclaimer, the term of this patent is extended or adjusted under 35 U.S.C. 154(b) by 49 days.

(21) Appl. No.: 10/851,313

(22) Filed: May 21, 2004

(65) Prior Publication Data

US 2004/0213998 A1 Oct. 28, 2004

Related U.S. Application Data

(62) Division of application No. 10/263,618, filed on Oct. 2, 2002, now abandoned.

(51) Int. Cl.
*B32B 18/00* (2006.01)

(52) U.S. Cl. .................. 428/403; 420/900; 423/646; 501/96.4; 501/133

(58) Field of Classification Search ............... 428/402, 428/403; 501/96.4, 133; 420/900; 429/218.2; 423/646
See application file for complete search history.

(56) References Cited

U.S. PATENT DOCUMENTS

| | | |
|---|---|---|
| 1,266,205 A | 5/1918 | Brock |
| 1,525,073 A | 2/1925 | Fontenot |
| 1,536,065 A | 5/1925 | Billings |
| 1,555,718 A | 9/1925 | Schroeder |
| 1,771,400 A | 7/1930 | Daubenspeck |
| 2,070,708 A | 2/1937 | Brokaw |
| 2,773,561 A | 12/1956 | Hunter |
| 3,165,099 A | 1/1965 | Vanderpool |
| 3,260,620 A | 7/1966 | Gruber |
| 3,357,864 A | 12/1967 | Huber |
| 3,432,354 A | 3/1969 | Jost |
| 3,436,270 A | 4/1969 | Oswin et al. |
| 3,454,429 A | 7/1969 | Gruber |
| 3,532,548 A | 10/1970 | Stachurski |
| 3,536,535 A | 10/1970 | Lippincott |
| 3,577,281 A | 5/1971 | Pountney et al. |
| 3,663,298 A | 5/1972 | McCoy et al. |
| 3,674,702 A | 7/1972 | Mackenzie et al. |
| 3,717,505 A | 2/1973 | Unkle, Jr. et al. |
| 3,822,149 A | 7/1974 | Hale |
| 3,842,248 A | 10/1974 | Yarnell et al. |
| 3,926,169 A | 12/1975 | Leshner et al. |
| 3,928,072 A | 12/1975 | Gerbier et al. |
| 3,932,600 A | 1/1976 | Gutbier et al. |
| 3,963,519 A | 6/1976 | Louie |
| 3,975,913 A | 8/1976 | Erickson |
| 3,977,990 A | 8/1976 | Beckert et al. |
| 3,980,061 A | 9/1976 | McAlister |
| 4,000,003 A | 12/1976 | Baker et al. |
| 4,002,726 A | 1/1977 | Filby |
| 4,051,072 A | 9/1977 | Bedford et al. |
| 4,056,373 A | 11/1977 | Rubin |
| 4,085,590 A | 4/1978 | Powell et al. |
| 4,164,912 A | 8/1979 | Beylor |
| 4,185,979 A | 1/1980 | Woolley |
| 4,186,712 A | 2/1980 | Fitzner et al. |
| 4,211,537 A | 7/1980 | Teitel |
| 4,249,654 A | 2/1981 | Helverson |
| 4,302,179 A | 11/1981 | Pont |
| 4,302,217 A * | 11/1981 | Teitel ...................... 48/189.2 |
| 4,319,552 A | 3/1982 | Sauer et al. |
| 4,343,272 A | 8/1982 | Buck |
| 4,359,396 A | 11/1982 | Maeland |
| 4,383,198 A | 5/1983 | Hosking |

(Continued)

FOREIGN PATENT DOCUMENTS

WO     WO-9719202     5/1997

(Continued)

OTHER PUBLICATIONS

Amos, Wade A., "Costs of Storing and Transporting Hydrogen", *National Renewable Energy Laboratory, NREL/TP-570-25106*, (Nov. 1998),1-59.

(Continued)

*Primary Examiner*—Roy King
*Assistant Examiner*—Ngoclan T. Mai
(74) *Attorney, Agent, or Firm*—Blakely, Sokoloff, Taylor & Zafman LLP

(57) ABSTRACT

Improved hydrogen storage materials are disclosed. A first material comprises a hydrogen storage nanomaterial that contains nanoparticles or nanoparticle clusters of a metal that is capable of combining with hydrogen to form a metal hydride. The nanomaterials may be formed using a thermal spray process. A second material comprises a micro-sized support that contains a hydrogen storage material deposited thereon. The hydrogen storage material may comprise a thermal spray deposit formed on a fly ash particle. A third material comprises a hydrogen permeable container having a hydrogen storage material therein. The container may comprise a microparticle having an internal void (e.g., a fly ash cenosphere or glass microsphere) containing a hydrogen storage material that has been permeated therein. Alternatively, the container may comprise an enclosing layer formed over a hydrogen storage material. The enclosing layer may be a deposited protective layer formed over a particle of a hydrogen storage material.

6 Claims, 8 Drawing Sheets

U.S. PATENT DOCUMENTS

| | | |
|---|---|---|
| 4,406,867 A | 9/1983 | Marcinkowsky et al. |
| 4,415,512 A | 11/1983 | Torobin |
| 4,415,896 A | 11/1983 | Allgood |
| 4,431,520 A | 2/1984 | Giuliani et al. |
| 4,433,063 A | 2/1984 | Bernstein et al. |
| 4,436,537 A | 3/1984 | Turillon |
| 4,448,160 A | 5/1984 | Vosper |
| 4,459,270 A | 7/1984 | Leppard et al. |
| 4,468,854 A | 9/1984 | Chou et al. |
| 4,477,415 A | 10/1984 | Fecan et al. |
| 4,482,134 A | 11/1984 | Uda et al. |
| 4,489,049 A | 12/1984 | Forester et al. |
| 4,497,973 A | 2/1985 | Heath et al. |
| 4,537,761 A | 8/1985 | Reed et al. |
| 4,537,839 A | 8/1985 | Cameron |
| 4,546,740 A | 10/1985 | Clements et al. |
| 4,570,446 A | 2/1986 | Matsubara et al. |
| 4,589,919 A | 5/1986 | Goodell et al. |
| 4,599,867 A | 7/1986 | Retallick |
| 4,608,560 A | 8/1986 | Allgood |
| 4,608,830 A | 9/1986 | Peschka et al. |
| 4,613,362 A | 9/1986 | Welter et al. |
| 4,684,751 A | 8/1987 | Trogler et al. |
| 4,687,650 A | 8/1987 | Goodell et al. |
| 4,716,736 A | 1/1988 | Schwarz |
| 4,728,580 A | 3/1988 | Grasselli et al. |
| 4,757,456 A | 7/1988 | Benghiat et al. |
| 4,783,374 A | 11/1988 | Custer et al. |
| 4,793,980 A | 12/1988 | Torobin |
| 4,799,156 A | 1/1989 | Shavit et al. |
| 4,809,771 A | 3/1989 | Kennel et al. |
| 4,820,957 A | 4/1989 | Zivkovich |
| 4,867,785 A | 9/1989 | Keem et al. |
| 4,887,556 A | 12/1989 | Gladstone |
| 4,936,869 A | 6/1990 | Minderman et al. |
| 5,080,875 A | 1/1992 | Bernauer |
| 5,104,838 A | 4/1992 | Fujita et al. |
| 5,125,574 A | 6/1992 | Anderson et al. |
| 5,126,104 A | 6/1992 | Anand et al. |
| 5,217,506 A | 6/1993 | Edlund et al. |
| 5,219,678 A | 6/1993 | Hasebe et al. |
| 5,227,047 A | 7/1993 | Hwang |
| 5,248,649 A | 9/1993 | Mosley, Jr. |
| 5,250,368 A | 10/1993 | Golben et al. |
| 5,277,705 A | 1/1994 | Anderson et al. |
| 5,277,999 A | 1/1994 | Ovshinsky et al. |
| 5,283,572 A | 2/1994 | McClelland et al. |
| 5,296,438 A | 3/1994 | Heung |
| 5,315,531 A | 5/1994 | Oravetz et al. |
| 5,330,858 A | 7/1994 | Shundou et al. |
| 5,330,861 A | 7/1994 | Fetcenko et al. |
| 5,360,461 A | 11/1994 | Meinzer |
| 5,372,617 A | 12/1994 | Kerrebrock et al. |
| 5,372,629 A | 12/1994 | Anderson et al. |
| 5,383,113 A | 1/1995 | Kight et al. |
| 5,411,928 A | 5/1995 | Heung et al. |
| 5,443,616 A | 8/1995 | Congdon |
| 5,451,474 A | 9/1995 | Wu et al. |
| 5,456,740 A | 10/1995 | Snow et al. |
| 5,465,206 A | 11/1995 | Hilt et al. |
| 5,483,455 A | 1/1996 | Lay et al. |
| 5,495,239 A | 2/1996 | Ouellette |
| 5,499,279 A | 3/1996 | Chakraborty |
| 5,504,223 A | 4/1996 | Rosen et al. |
| 5,506,069 A | 4/1996 | Ovshinsky et al. |
| 5,512,787 A | 4/1996 | Dederick |
| 5,532,074 A | 7/1996 | Golben |
| 5,536,591 A | 7/1996 | Fetcenko et al. |
| 5,554,456 A | 9/1996 | Ovshinsky et al. |
| 5,557,254 A | 9/1996 | Johnson et al. |
| 5,572,438 A | 11/1996 | Ehlers et al. |
| 5,578,108 A | 11/1996 | Yamaguchi et al. |
| 5,590,197 A | 12/1996 | Chen et al. |
| 5,605,585 A | 2/1997 | Yamamoto et al. |
| 5,612,149 A | 3/1997 | Hartvigsen et al. |
| 5,616,432 A | 4/1997 | Ovshinsky et al. |
| 5,630,193 A * | 5/1997 | Miyake et al. ............... 396/539 |
| 5,649,117 A | 7/1997 | Landry |
| 5,653,951 A * | 8/1997 | Rodriguez et al. .......... 423/439 |
| 5,654,115 A | 8/1997 | Hasebe et al. |
| 5,654,886 A | 8/1997 | Zereski, Jr. et al. |
| 5,684,965 A | 11/1997 | Pickering |
| 5,688,611 A | 11/1997 | Golben |
| 5,696,906 A | 12/1997 | Peters et al. |
| 5,697,221 A | 12/1997 | Sapru et al. |
| 5,699,276 A | 12/1997 | Roos |
| 5,699,528 A | 12/1997 | Hogan |
| 5,702,491 A | 12/1997 | Long et al. |
| 5,703,257 A | 12/1997 | Rosen et al. |
| 5,710,889 A | 1/1998 | Clark et al. |
| 5,728,464 A | 3/1998 | Checketts |
| 5,738,953 A | 4/1998 | Lichtenberg et al. |
| 5,762,119 A | 6/1998 | Platz et al. |
| 5,771,946 A | 6/1998 | Kooy et al. |
| 5,778,972 A | 7/1998 | Sapru et al. |
| 5,780,701 A | 7/1998 | Kaska et al. |
| 5,797,269 A | 8/1998 | Nishimura et al. |
| 5,817,157 A | 10/1998 | Checketts |
| 5,840,437 A | 11/1998 | Diethelm |
| 5,840,440 A | 11/1998 | Ovshinsky et al. |
| 5,852,993 A | 12/1998 | Anderson |
| 5,882,611 A | 3/1999 | Williams et al. |
| 5,908,487 A | 6/1999 | Nishimura et al. |
| 5,932,372 A | 8/1999 | Rendina |
| 5,943,656 A | 8/1999 | Crooks et al. |
| 5,961,697 A | 10/1999 | McManus et al. |
| 5,962,155 A | 10/1999 | Kuranaka et al. |
| 5,964,965 A | 10/1999 | Schulz et al. |
| 5,965,267 A | 10/1999 | Nolan et al. |
| 5,980,726 A | 11/1999 | Moulthrop, Jr. et al. |
| 5,987,895 A | 11/1999 | Nishimura et al. |
| 6,052,671 A | 4/2000 | Crooks et al. |
| 6,074,447 A | 6/2000 | Jensen |
| 6,074,453 A * | 6/2000 | Anderson et al. .............. 75/245 |
| 6,086,729 A | 7/2000 | Bredesen et al. |
| 6,088,659 A | 7/2000 | Kelley et al. |
| 6,088,688 A | 7/2000 | Crooks et al. |
| 6,106,801 A | 8/2000 | Bogdanovic et al. |
| 6,119,651 A | 9/2000 | Anderson |
| 6,120,936 A | 9/2000 | Young et al. |
| 6,122,603 A | 9/2000 | Budike, Jr. et al. |
| 6,136,156 A | 10/2000 | El-Shall et al. |
| 6,139,302 A | 10/2000 | Wood et al. |
| 6,143,052 A | 11/2000 | KiyoKawa et al. |
| 6,152,995 A | 11/2000 | Edlund |
| 6,165,643 A | 12/2000 | Doyle et al. |
| 6,193,929 B1 | 2/2001 | Ovshinsky et al. |
| 6,194,092 B1 | 2/2001 | Ohara et al. |
| 6,197,990 B1 | 3/2001 | Oda et al. |
| 6,218,034 B1 | 4/2001 | Faris et al. |
| 6,221,310 B1 | 4/2001 | Checketts et al. |
| 6,228,519 B1 | 5/2001 | Faris et al. |
| 6,231,642 B1 | 5/2001 | Shelby et al. |
| 6,239,508 B1 | 5/2001 | Faris et al. |
| 6,245,280 B1 | 6/2001 | Tan et al. |
| 6,247,565 B1 | 6/2001 | Saint-Antonin et al. |
| 6,248,216 B1* | 6/2001 | Bi et al. ................. 204/157.15 |
| 6,267,229 B1 | 7/2001 | Heung |
| 6,270,719 B1 | 8/2001 | Fetcenko et al. |
| 6,274,093 B1 | 8/2001 | Long et al. |
| 6,283,812 B1 | 9/2001 | Jin et al. |
| 6,296,960 B1 | 10/2001 | Faris et al. |
| 6,297,592 B1 | 10/2001 | Goren et al. |
| 6,299,997 B1 | 10/2001 | Faris et al. |

| | | | |
|---|---|---|---|
| 6,305,442 B1 | 10/2001 | Ovshinsky et al. | |
| 6,306,339 B1 | 10/2001 | Kiyokawa et al. | |
| 6,306,534 B1 | 10/2001 | Faris et al. | |
| 6,309,771 B1 | 10/2001 | Faris et al. | |
| 6,312,844 B1 | 11/2001 | Faris | |
| 6,327,541 B1 | 12/2001 | Pitchford et al. | |
| 6,328,821 B1 | 12/2001 | Ovshinsky et al. | |
| 6,335,111 B1 | 1/2002 | Faris et al. | |
| 6,365,292 B1 | 4/2002 | Faris et al. | |
| 6,368,406 B1 | 4/2002 | Deevi et al. | |
| 6,372,377 B1 | 4/2002 | Ovshinsky et al. | |
| 6,376,115 B1 | 4/2002 | Tsai et al. | |
| 6,378,601 B1 | 4/2002 | Ovshinsky et al. | |
| 6,382,264 B1 | 5/2002 | Tsai et al. | |
| 6,383,673 B1 | 5/2002 | Faris et al. | |
| 6,387,152 B1 | 5/2002 | Klassen et al. | |
| 6,395,405 B1 | 5/2002 | Buxbaum | |
| 6,403,244 B2 | 6/2002 | Faris et al. | |
| 6,403,772 B1 | 6/2002 | Ewen et al. | |
| 6,410,174 B1 | 6/2002 | Faris | |
| 6,413,670 B1 | 7/2002 | Ovshinsky et al. | |
| 6,418,275 B1 | 7/2002 | Yang | |
| 6,425,251 B2 | 7/2002 | Stetson et al. | |
| 6,432,283 B1 | 8/2002 | Fairlie et al. | |
| 6,444,016 B2 | 9/2002 | Oshima et al. | |
| 6,451,463 B1 | 9/2002 | Tsai et al. | |
| 6,461,766 B1 | 10/2002 | Young et al. | |
| 6,471,935 B2 | 10/2002 | Jensen et al. | |
| 6,589,312 B1 * | 7/2003 | Snow et al. | 75/255 |
| 2002/0029820 A1 | 3/2002 | Ovshinsky et al. | |
| 2002/0073618 A1 | 6/2002 | Ovshinsky et al. | |
| 2002/0187896 A1 * | 12/2002 | Ryoo et al. | 502/418 |
| 2003/0026757 A1 | 2/2003 | Pecharsky et al. | |
| 2004/0009121 A1 | 1/2004 | Jensen et al. | |
| 2004/0016769 A1 | 1/2004 | Redmond | |
| 2004/0023087 A1 | 2/2004 | Redmond | |

FOREIGN PATENT DOCUMENTS

| | | |
|---|---|---|
| WO | WO-9719481 | 5/1997 |
| WO | WO-9721370 | 6/1997 |
| WO | WO-9726214 | 7/1997 |
| WO | WO-9736819 | 10/1997 |
| WO | WO-9826459 | 6/1998 |
| WO | WO-9850968 | 11/1998 |
| WO | WO-9954517 | 10/1999 |
| WO | WO-9955926 | 11/1999 |
| WO | WO-0007930 | 2/2000 |
| WO | WO-0013244 | 3/2000 |
| WO | WO-0020329 | 4/2000 |
| WO | WO-0061828 | 10/2000 |
| WO | WO-0062360 | 10/2000 |
| WO | WO-0066941 | 11/2000 |
| WO | WO-0069773 | 11/2000 |
| WO | WO-0070695 | 11/2000 |
| WO | WO-0191210 | 11/2000 |
| WO | WO-0079201 | 12/2000 |
| WO | WO-0104973 | 1/2001 |
| WO | WO-0116021 | 3/2001 |
| WO | WO-0120697 | 3/2001 |
| WO | WO-0134861 | 5/2001 |
| WO | WO-0138591 | 5/2001 |
| WO | WO-0139289 | 5/2001 |
| WO | WO-0144713 | 6/2001 |
| WO | WO-0144737 | 6/2001 |
| WO | WO-0148837 | 7/2001 |
| WO | WO-0181850 | 11/2001 |
| WO | WO-0188455 | 11/2001 |
| WO | WO-0192592 | 12/2001 |
| WO | WO-0202835 | 1/2002 |
| WO | WO-0207420 | 1/2002 |
| WO | WO-0231897 | 4/2002 |
| WO | WO-0231900 | 4/2002 |
| WO | WO-0212118 | 7/2002 |
| WO | WO-0256396 | 7/2002 |
| WO | WO-02057006 | 7/2002 |
| WO | WO-02066369 | 8/2002 |
| WO | WO-02069419 | 9/2002 |

OTHER PUBLICATIONS

Arnold, Gerd , "Advanced Hydrogen Storage Technologies", *Global Alternative Propulsion Center (GAPC) GM*, 10.

Barbir, F., "Review of Hydrogen conversion technologies", *Clean Energy Institute*, University of Miami, Florida, 1-17.

Billings, Roger E., "Advanced Engine Conversion Direct Cylinder Injection", *Hydrogen Worldview, International Academy of Science*, ISBN 096316340X,(Dec. 1, 1991),1-5

Billings, Roger E., "Hydrogen Stored as Metal Hydride The Safest Fuel on Earth", *Hydrogen Worldview, International Academy of Science*, ISBN 096316340X,(Dec. 1, 1991),1-11.

Billings, Roger E., "The Hydrogen Fuel Cell Efficiency if the Key", *Hydrogen Worldview, International Academy of Science*, ISBN 096316340X,(Dec. 1, 1991),1-10.

Bogdanovic, Borislav , et al., "Metal-doped sodium alumunium hydrides as potential new hydrogen storage materials", *Journal of Alloys and Compounds 302*, (2000),36-58.

Bogdanovic, Borislav , et al., "Ti-doped alkali metal aluminum hydrides as potential novel reversible hydrogen storage materials", *Journal of Alloys and Compounds 253-254*, (1997),1-9.

Bogdanovic, Borislav , et al., "Ti-doped $NaAlH_4$ as a hydrogen-storage material—preparation by Ti-catalyzed hydrogenation of aluminum powder in conjunction with sodium hydride", *Applied Physics A*, 72:221, (2001),221-223.

Castelli, Brian , "Chief of Staff to the Assistant Secretary of the Office of Energy Efficiency and Renewable Energy to the Attendees of the Coal Hydrogen Workshop", (Sep. 19, 2000),10.

Concordia University, "Chapter 9—Hydrogen", *Chemistry 242-Inorganic Chemistry II*, CHEM242-1999 Chapter 9 Course Notes. Retrieved from artsandscience.concordia.ca/facstaff/A-C/BIRD/c242/notes_ch9-cwp.html,(Apr. 17, 2002),6.

Douglas, David , "New Energy Company to Deliver Inexpensive Power For Your Car, Home or Business by Mail", *The Free Wire Service*, retrieved Mar. 28, 2002 from www.prweb.com/releases/2002/3/prweb35853.php, Mar. 28, 2002),1.

Driess, Matthias , "From molecular aggregates to novel organosilicon and phosphorus/arsenic compounds", *Pure Applied Chemicals*, vol. 71, No. 3, (1999),437-443.

Energetics, Incorporated, "Proceedings National Hydrogen Vision Meeting", Washington, DC, (Nov. 15-16, 2001),1-24.

Flint, Jerry , "Hydrogen Bomb", *Forbes Magazine*, (Mar. 4, 2002),100.

FST, Inc., "FST, Inc. Unveils Hydrogen Energy Appliance, Line of Hydrogen Products to Power Cars, Electrical Generators, Remote & Back-up Power", *Press Release*, San Francisco, CA, (Oct. 15, 2002),2.

FUELCELLSTORE.COM, "Hydrogen Storage Products", Retrieved from www.fuelcellstore.com/products/index/hydrogen_storage.html, (Aug. 23, 2002),1-2.

FUELCELLSTORE.COM, "Solid-H™, Metal Hydride Hydrogen Storage Tanks", Retrieved from www.fuelcellstore.com/products/hci/products_desc.htm. (Aug. 23, 2002),1-3.

Gross, K. J., et al., "Dynamic in situ X-ray diffraction of catalyzed alanates", *Jouranal of Alloys and Compounds 330-322*, (2002),691-695.

Gross, K.J. , et al., "Hydride Development for Hydrogen Storage", *Proceedings of the 2000 Hydrogen Program Review*, NREL/CP-570-28890,16.

Gross, Karl. J., et al., "In-situ X-ray diffraction study of the decomposition of $NaAlH_4$", *Journal of Alloys and Compounds 297*, (2000),270-281.

Gross, K. L., et al., "Light-Weight Hydride Development", *Proceedings of the 2001 DOE Hydrogen Program Review NREL/CP-570-30535, Sandia National Laboratories*, Livermore, CA, (2001),1-14.

Hytek Microsystems, "Miniature Proportionally Controlled Heater", *HY-7110 Micro-heater*, 33-34.

Hytek Microsystems, "Miniature Proportionally Controlled Heater", *HY-7115 Micro-Heater; 5V*, 13-14.

Jensen, Craig M., et al., "Advanced titanium doping of sodium aluminum hydride: seque to a practical hydrogen storage material?", *International Journal of Hydrogen Energy 24*, (1999),461-465.

Jensen, Craig M., et al., "Catalytically Enhanced Systems For Hydrogen Storage", *Proceedings of the 2001 DOE Hydrogen Program Review NREL/CP-570-30535, Department of Chemistry*, University of Hawaii, (2001),1-9.

Jensen, Craig M., et al., "Catalytically Enhanced Systems For Hydrogen Storage", *Proceedings of the 2001 DOE Hydrogen Program Review NREL/CP-57028890, Department of Chemistry*, University of Hawaii, (1-6),2001.

Jensen, Craig M., et al., "Hydrogen Storage Via Calalytically Enhanced Metal Hydrides", *Proceedings of the 1999 U.S. DOE Hydrogen Program Review NREL/CP-570-26938*, (1999),1-6.

JP Technologies, Inc., "Miniature Metal Foil Heaters and RTD Combinations", Retrieved from www.jptechnologies.com/mmfhrtdcomb.html, (Jul. 23, 2002),1-4.

Lynch, F. E., "Backfire Control Techniques For Hydrogen Fueled Internal Combustion Engines", *Hydrogen Tech Papers, International Academy of Science*, www.science.edu/tech/h74001.htm, retrieved Aug. 18, 2003,1-9.

McCabe, Michael , "Hydrogen-driven Revolution—not your father's SUV: Hypercar's sleek design is making waves", *Commuter Chronicles*, (Feb. 25, 2002),1.

Millenium Cell, Inc., "The Hydrogen on Demand™ System", *Our Technology Solutions—White Paper*, retrieved from www.milleniumcell.com/solutions/white_hydrogen.html,(Sep. 25, 2002),1-2.

Minco Products, Inc., "Thermofoil™ Heater/Sensors", *Minco Bulletin TF-9*, 1-2.

Minco Products, Inc., "Thermofoil™ Heaters and Controllers", retrieved from www.minco.com/heaters.php, (Jul. 18, 2002),1-3.

Moore, Bill , "Nano, Nano!-Part 2", Retrieved from evworld.com/databases/storybuilder/cfm?storyid=400&subcookie=1, (Sep. 6, 2002),1-4.

Niedzwiecki, Alan , "Hydrogen Storage", *Hydrogen Vision Meeting, QUANTUM Technologies Worldwide, Inc.*, (Nov. 2001),23.

Nion, Fabien , et al., "Metal Hydrides as hydrogen storage system for fuel cells", *EEIGM project 2001*. 40.

Phillips, J. , et al., "Power of plasma production of metallic nanoparticles", *Science & Technology Corporation @UNM. UNM—604*, Retrieved from stc.unm.edu/portfolio/abstract.cfm?docket=UNM-604,(Jul. 23, 2002),1.

Popular Science, "Yes, You Can Buy This Home Fuel Cell", *Popular Science*, (Feb. 2002),10.

Powerball Technologies, "The Powerball Concept . . . ", retrieved from www.powerball.net/concept/index.shtml, (Dec. 13, 2002),1.

Powerball Technologies, "The Powerball process is safe, clean and 100% recycleable!", Retrieved from www.powerball.net/process/index.html, (Dec. 13, 2002),1-2.

Proton Energy, "Proton Energy Announces Major Breakthrough in Hydrogen Generation", *EyeforFuelCells-Facilitating the commercialisation of Fuell Cell technology*, Press Release,(Nov. 15, 2001),1-2.

Sachs, C. , et al., "Solubility of hydrogen in single-sized palladium clusters", *Physical Review B.*, vol. 64, 075408, (2001),1-10.

Sandia National Labs, "Engineered Materials Department", Retrieved from www.ca.sandia.gov/Materials&EngineeringSciences/EngMat/dept_pg.html, (Apr. 18, 2002),1-2.

Sandrock, G. , et al., "Engineering considerations in the use of catalyzed sodium alanates for hydrogen storage", *Journal of Alloys and Compounds 330-322*, (2002),696-701.

Stetson, N. , et al., "Material Classification Regulations and their Impact on Reversible Metal Hydride Hydrogen Storage Systems", Texaco Ovonic Hydrogen Solutions, retrieved Aug. 29, 2003 from www.ovohi.com, (Aug. 29, 2003),1-18.

Texaco Ovonic Hydrogen Solutions, "Ovonic™ Solid-State Hydrogen Bulk Storage System", retrieved Apr. 29, 2003 from www.ovonic.com/PDFs/Hydrogen/SpecSheet/ovonic_hydrogen_spec_032103.pdf, (Apr. 29, 2003),1.

Texaco Ovonic Hydrogen Solutions, "We help fuel imaginations.", retrived Apr. 29, 2003 from www.ovonic.com/sol_srv/3_3_hydrogen_sol/hydrogen_sol.htm, (Apr. 29, 2003),1-8.

Toreki, Rob , "Cyclopentadienyl Ligands", *The Organometallic HyperTextBook*. Retrieved from www.ilpi.com/organomet/cp.html, (Jan. 13, 2002),1-6.

Turgut, Z. , et al., "Magnetic properties and microstructural observations of oxide coated FeCo nanocrystals before and after compaction", *Journal of Applied Physics*, vol. 85, No. 8, (Apr. 15, 1999),4406-4408.

U.S. Department of Energy, "Hydrogen—Fuel Cells for Transportation—Fuel for Fuel Cells—2002 Annual Program/Lab R&D Review", *H2 Information Network*, Retrieved from www.eren.doe.gov/hydrogen_review.html,(May 6-8, 2002),1-3.

U.S. Department of Energy, "Minutes of the Hydrogen Technical Advisory Panel", *H2 Information Network*, Retrieved from www.eren.doe.gov/hydrogen/docs/htap_minutes_spring01.html,(Apr. 16-21, 2001),1-12.

Young, Rosa C., "Advances of Solid Hydrogen Storage Systems", *Texaco Ovonic Hydrogen Systems, LLC. 14th Annual Conference of NHA*, (Mar. 4-6, 2003),1-16.

Zaluska, A. , "Sodium alanates for reversible hydrogen storage", *Journal of Alloys and Compounds 298*, (2000),125-134.

Zaluska, A. , et al., "Structure, catalysis and atomic reactions on the nona-scale: a systematic approach to metal hydrides for hydrogen storage", *Applied Physics A*, 72, (2001),157-165.

Zidan, A. , et al., "Hydrogen cycling behavior of zirconium and titanium-zirconium-doped sodium aluminum hydride", *Journal of Alloys and Compounds 285*, (1999),119-122.

* cited by examiner

SOLID-STATE HYDROGEN STORAGE SYSTEMS

The present application is a divisional of U.S. patent application Ser. No. 10/263,618 filed Oct. 2, 2002 now abandoned, entitled "SOLID-STATE HYDROGEN STORAGE SYSTEMS", currently pending.

BACKGROUND

1. Field

Embodiments of the invention relate to the field of hydrogen storage.

2. Background

The widespread use of fossil fuels for energy and for powering internal combustion engine vehicles has created significant air quality problems in much of the industrialized world. Air pollution in turn is related to numerous health and environmental problems. A variety of alternative energy sources, such as nuclear, solar, geothermal and wind power have been proposed to reduce dependence on fossil fuels. However, drawbacks exist for each of these alternative energy sources.

One of the most promising fossil fuel alternatives is hydrogen. Hydrogen can be combined with oxygen via combustion, or through fuel cell mediated oxidation/reduction reactions, to produce heat, or electrical power. After many years of development, hydrogen-based fuel cells are a viable source of energy and currently offer a number of advantages over petroleum-based internal combustion engines, and the like. Often hydrogen-based fuel cells are more efficient, operate with less friction, operate at lower temperatures, are less polluting, do not emit carbon dioxide (a suspected greenhouse gas), are quieter, etc. As a fuel, hydrogen offers a number of advantages including being abundant, affordable, clean, renewable, and having favorable energy density. The primary product of this reaction—water—is non-polluting and can be recycled to regenerate hydrogen and oxygen.

Unfortunately, existing approaches for storing, distributing, and recovering hydrogen are extremely limiting, and are a significant impediment to the widespread utilization of hydrogen fuel, and the realization of the associated advantages. To illustrate some of the problems, consider one of the more prevalent approaches based on pressurized tanks or cylinders to store gaseous or liquefied hydrogen.

This approach involves producing hydrogen gas, liquefying or pressurizing the hydrogen into a pressurized cylinder, shipping the cylinders to the point of use, and releasing the hydrogen from the cylinders. Due to hydrogen's flammability characteristics (e.g., flammability over a wide range of concentrations in air, and low spark temperatures), the storage, distribution, and use of hydrogen in such tanks is highly regulated and controlled. In order to provide improved safety, and due to the high pressures involved, the tanks are often heavy, contain specialized explosion-proof components, and are correspondingly expensive. Nevertheless, even with these precautions, there is still a significant risk that hydrogen may be released, and explode, during loading, unloading, or distribution. Such risks render the approach generally unfavorable for powering motorized vehicles. Accordingly, the costs and dangers associated with these prior art techniques for storing and distributing hydrogen are prohibitive, and limit the utilization of hydrogen as fuel.

Thus, the potential for using hydrogen as a fuel is great, but there are significant and limiting problems with conventional approaches for storing, distributing, and recovering hydrogen.

BRIEF DESCRIPTION OF THE SEVERAL VIEWS OF THE DRAWINGS

The novel features believed characteristic of the invention are set forth in the appended claims. The present invention is illustrated by way of example, and not by way of limitation, in the figures of the accompanying drawings and in which like reference numerals refer to similar elements. The invention itself, however, as well as a preferred mode of use, will best be understood by reference to the following detailed description of an illustrative embodiment when read in conjunction with the accompanying drawings:

DETAILED DESCRIPTION

Figure 1:
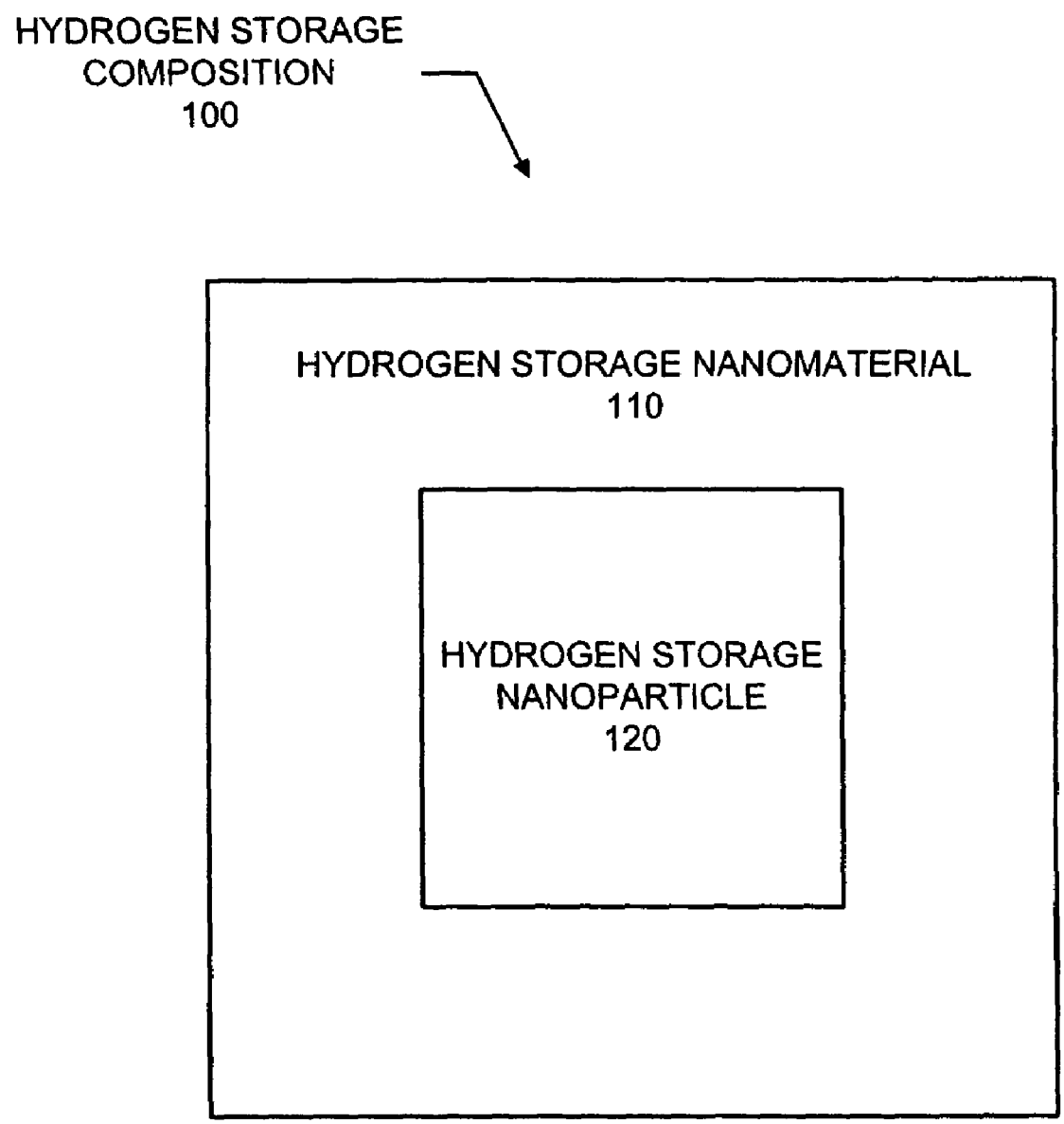
FIG. 1 shows a hydrogen storage composition containing a hydrogen storage nanomaterial that includes a hydrogen storage nanoparticle, according to embodiments of the invention.

Described herein are new and useful materials for hydrogen storage. To aid in the understanding of the present invention, the following description provides specific details of presently preferred embodiments of the invention. It will be apparent, however, to one skilled in the art, that the present invention may be practiced without some of these specific details. As one example, numerous other hydrogen storage materials known in the arts may replace the specific hydrogen storage material disclosed herein. As another example, different techniques known in the arts may be used to form nanomaterials, substrates having hydrogen storage material deposits, and micro-sized containers having hydrogen storage materials therein. Where the discussion refers to well-known structures and devices, block diagrams are used, in part, to demonstrate the broad applicability of the present invention to a wide range of such structures and devices.

The utility of hydrogen as a fuel depends to a large extent on storage and transportation of the hydrogen. Solid-state metal hydride materials for storing hydrogen are known in the arts. The metal hydride materials are inherently safer than tanks of compressed gas or cryogenic liquid. This is particularly true for on-board storage of hydrogen in a hydrogen-powered vehicle. However, a number of significant problems with solid-state hydrogen storage materials remain. One problem is loss of hydrogen to the metal hydride subsurface (within the bulk interior of the metal hydrides). The hydrogen within the interior is surrounded on all sides by metal atoms that form tight bonds to the hydrogen. These tight bonds need to be broken in order to recover the hydrogen. More energy is needed to break these bonds, resulting in higher temperatures for recovery of hydrogen from the metal hydride. Additionally, the recovery of hydrogen is typically incomplete due to some portion of the hydrogen remaining bound within the bulk interior of the metal hydride.

The present inventors have discovered various hydrogen storage materials that largely overcome these prior art problems and significantly advance the art of hydrogen storage. The following sections of the detailed description of the invention disclose the following materials for hydrogen storage:

I. Hydrogen Storage Nanomaterials

II. Particle Supports Having Hydrogen Storage Material Deposits

III. Hydrogen Permeable Containers Having Hydrogen Storage Material Contained Therein I. Hydrogen Storage Nanomaterials The invention of embodiments encompasses a hydrogen storage nanomaterial. The hydrogen storage nanomaterial may contain a metal that is capable of forming a metal hydride by combining with hydrogen. The nanomaterial may comprise discrete particles or clusters of particles (e.g., aggregates or agglomerates) having a substantial proportion of the metal atoms exposed at the surface. In one aspect the nanoparticles may have less than one thousand, or less than five thousand total metal atoms. The invention of other embodiments encompasses a method for making the hydrogen storage nanomaterial. The nanomaterial may be formed by gas phase synthesis. Exemplary gas phase synthesis processes include gas phase condensation process and gas phase thermal decomposition. Exemplary gas phase condensation processes include thermal spray processes (e.g., plasma spray processes). As an example, the nanomaterial may be formed by condensing a hydrogen storage material atomized within a thermal or plasma spray. Hydrogen may be combined with the hydrogen storage material during the nanomaterial formation process, or subsequently, to form a hydrogen storing material. The hydrogen storing nanomaterials may be stored in cassettes, tanks, cylinders, rail cars, or other storage systems. The invention of other embodiments encompasses recovering hydrogen from the nanomaterials, for example by heating, in order to supply hydrogen to a hydrogen utilization system such as a fuel cell, a hydrogen powered vehicle, or others known in the art.

FIG. 1 shows a hydrogen storage composition 100 containing a hydrogen storage nanomaterial 110 that includes a hydrogen storage nanoparticle 120, according to embodiments of the invention. As used herein the term nanomaterial will be used to refer to a material having a feature size in the range of approximately 1-100 nanometers (nm, one-billionth of a meter). As a non-limiting illustration, one nanometer spans approximately 3-5 atoms (depending on their size) aligned in a row. The typical feature size of interest will be the diameter of the nanoparticle 120. This nanoparticle will typically have a diameter in the range of approximately 1-100 nanometers. A small nanoparticle having a diameter of approximately 1 nm may contain approximately 10 atoms, whereas a large nanoparticle having a diameter of approximately 100 nm may contain approximately 100,000,000 atoms. In one embodiment of the invention, a significant proportion of the nanoparticles may contain not more than approximately 1000 atoms, or not more than approximately 5000 atoms, to provide materials with a relatively high ratio of exposed surface atoms to interior bulk atoms. Of course, the nanomaterial may contain numerous particles, and a person skilled in the art will appreciate that some particles may be formed smaller, or larger, than this range. For example, some particles may be approximately 0.1 nm and other particles may be approximately 1000 nm. Accordingly, an average sized nanoparticle may be considered to have a size in the range of approximately 1-100 nanometers. Within this size range the nanoparticles have hydrogen storage properties intermediate between those of single atoms and bulk hydrogen storage materials. The present inventors contemplate exploiting this characteristic in order to provide hydrogen storage materials with unexpectedly superior properties. The use of nanomaterials is not simply another step in miniaturization but a different paradigm entirely. Investigations by the inventors indicate that nanoparticles give unexpected results in hydrogen recovery.

The hydrogen storage nanomaterial may contain discrete nanoparticles or a cluster of particles. The cluster of nanoparticles may be an aggregate or agglomerate depending on how tightly the cluster is held together. The cluster may contain virtually any number of nanoparticles, from tens to many thousands. The cluster may have a generally open structure, due to the gaps between the nanoparticles, which may allow hydrogen to access the nanoparticles making up the cluster. A high percentage of the atoms of the material are exposed at the surface of the nanoparticles, and the overall nanomaterial has hydrogen storage characteristics that resemble those of the nanoparticles.

The present inventors have recognized that metal hydride nanoparticles and clusters behave differently than metal hydride microparticles and bulk metal hydride materials. The nanoparticles have a large surface area to weight ratio and a relatively large percentage of the total atoms that make up the particles are exposed at the surface. As an example, the surface area to weight ration may be approximately 200 $m^2/g$, or even higher. Hydrogen that combines with the exposed surface atoms may be less surrounded and less tightly bound than hydrogen that combines with interior bulk atoms, of which there are fewer percentage than in traditional bulk metal hydrides. The hydrogen at the surface may be removed or recovered more easily, at lower temperatures, and more fully, compared to hydrogen bound within the interior of a macroscopic chunk of the hydrogen storage material. Additionally, the diffusion of hydrogen within the bulk of a metal hydride is believed to be slow and may additionally limit recovery. The present inventors have also found that this yields unexpectedly superior results such as lower hydrogen recovery temperatures and more complete hydrogen recovery. Prior to the developments of the present inventors the use of nanomaterials for hydrogen storage and the corresponding improvements in hydrogen recovery have been unrecognized and unappreciated.

The nanomaterials may be formed by a variety of gas phase synthesis processes. Exemplary gas phase synthesis processes include but are not limited to gas phase condensation and gas phase thermal decomposition or pyrolysis. In a gas phase condensation process, a precursor material is melted, atomized, perhaps vaporized, condensed, and solidified to form a hydrogen storage nanomaterial. Exemplary gas phase condensation processes include among others vapor condensation processes, chemical vapor condensation, physical vapor deposition (PVD), thermal evaporation, thermal spray processes, plasma spray condensation, electrospray condensation, etc. The concepts will largely be illustrated through a thermal spray process, and in particular through a plasma spray process, although those having an ordinary level of skill in the art and the benefit of the present disclosure will appreciate that other gas phase synthesis processes known in the arts may also be used.

The inventors presently favor thermal spray processes for the good control over purity, size, shape, and crystallinity that they provide. Examples of thermal spraying processes that are known in the arts include but are not limited to plasma spraying, flame spraying (e.g., a high velocity oxygen-fuel spraying), arc spraying (e.g., arc wire spraying), and others (e.g., detonation gun spraying). It will be appreciated by those having an ordinary level of skill in the art and the benefit of the present disclosure that other techniques commonly used in the nanoparticle synthesis arts may also be used to form the hydrogen storage nanomaterials described herein, including among others sonochemical processing, cavitation processing, microemulsion processing, and high-energy ball milling.

Figure 2:
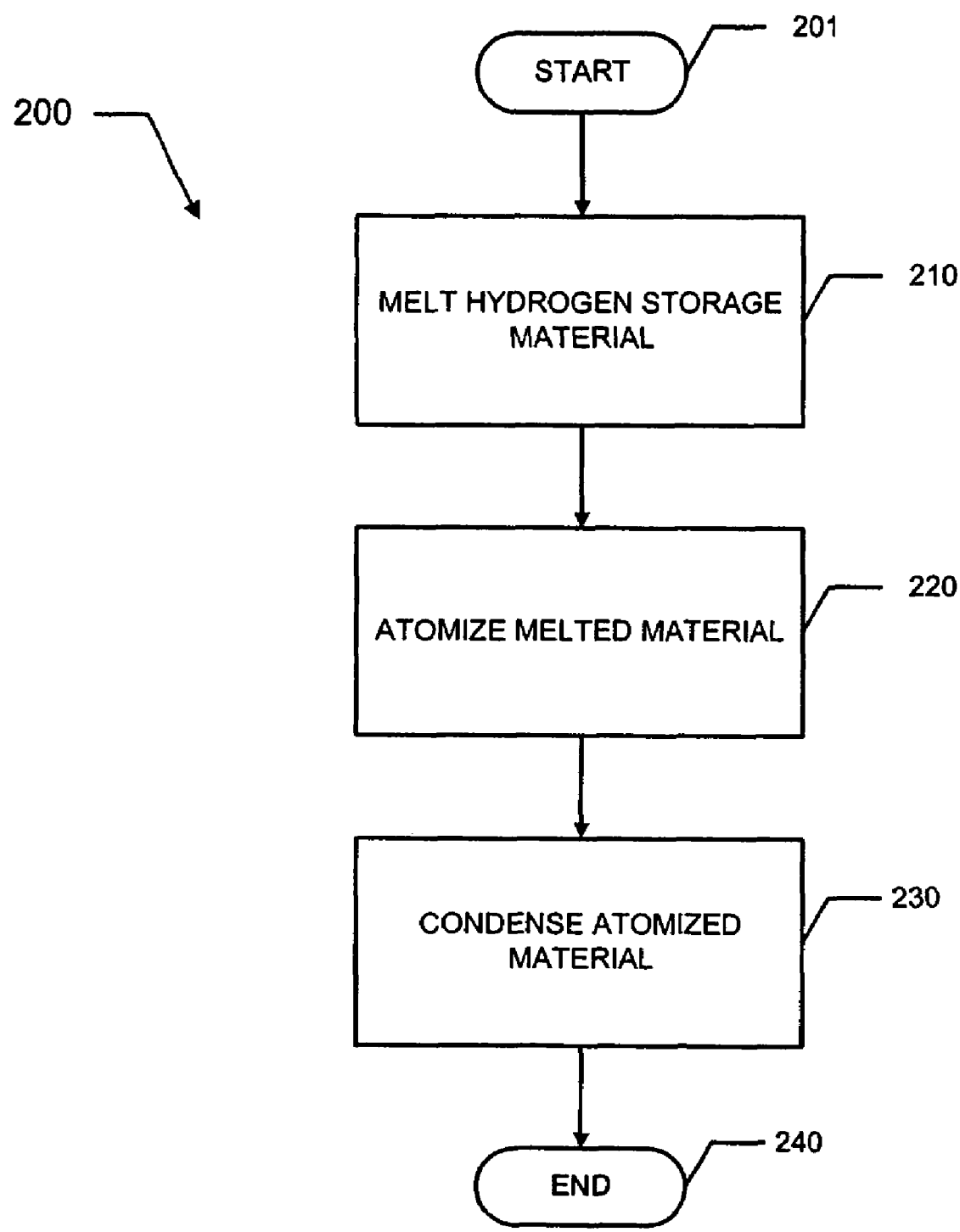
FIG. 2 shows a method for forming a hydrogen storage nanomaterial by a gas phase condensation process, according to embodiments of the invention.

FIG. 2 shows a method for forming a hydrogen storage nanomaterial by a gas phase condensation process, according to embodiments of the invention. After initiating at block 201, a hydrogen storage material is melted at block 210. For example, in a thermal spray process, a hydrogen storage material may be added to a source of heat (e.g., a plasma torch or arc) and heated to above its melting point. Next, the melted material is atomized at block 220. In the case of a thermal spray process the convective force of the spray, an additional compressed gas, vaporization of the material, or some combination may provide the atomization. Then, at block 230, the atomized material is condensed to form a nanomaterial. This may include combining finely divided particles to form less finely divided particles having on average a size in the range of approximately 1-100 nanometers and aggregating or agglomerating nanoparticles to form clusters. The method terminates at block 240.

Figure 3:
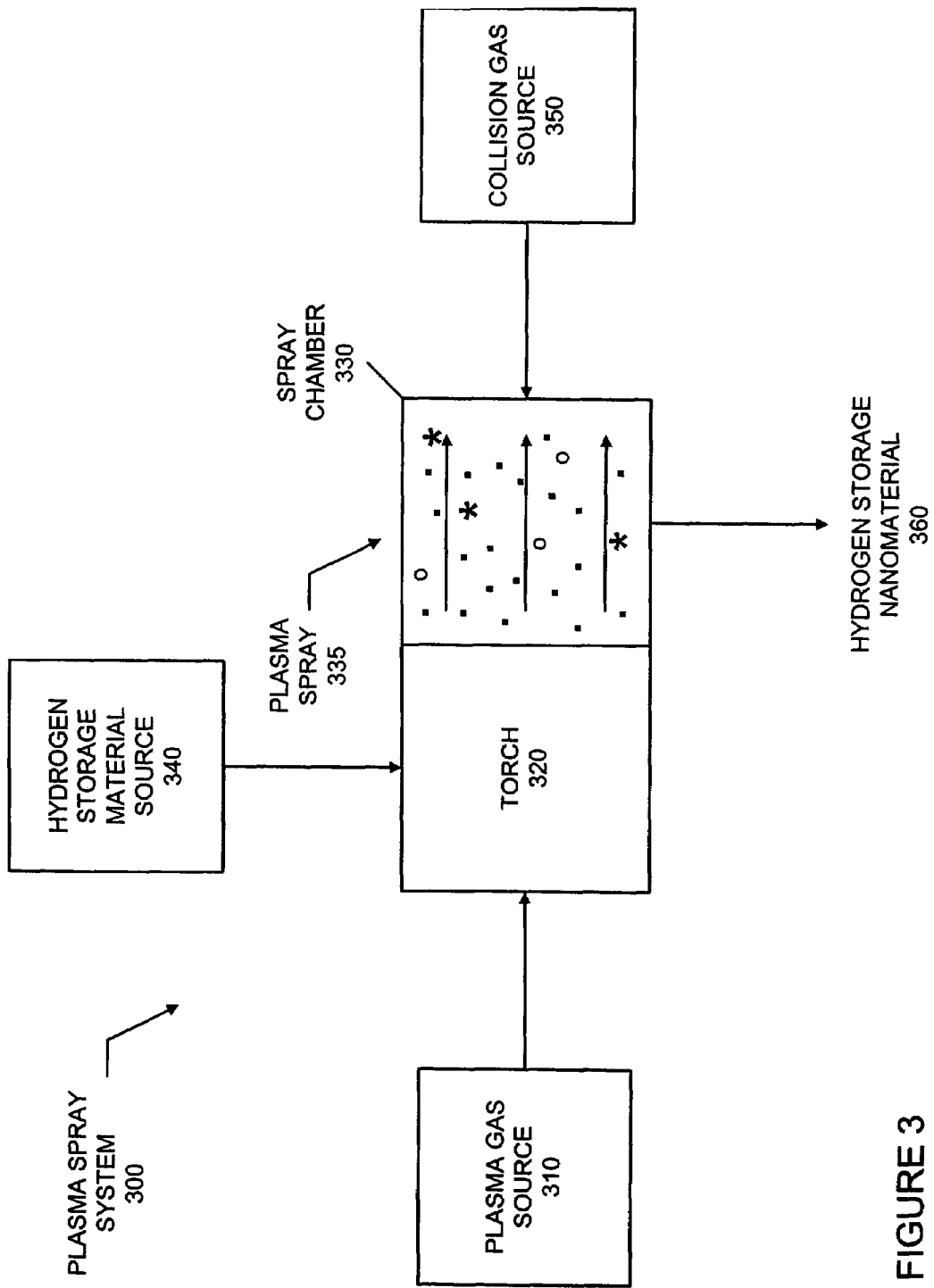
FIG. 3 shows a plasma spray system in which embodiments of the invention may be implemented.

FIG. 3 shows a plasma spray system 300 in which embodiments of the invention may be implemented. The plasma spray system includes a plasma gas source 310, a torch 320, a spray cooling chamber 330, a hydrogen storage material source 340, and a collision gas source 350. A plasma spray 335 and a hydrogen storage material 360 are formed in the system. Plasma spray processes provide a number of advantages including low levels of contamination, ease of operation and control, compact equipment with a small footprint area, and fast process cycles with short preheating times, rapid start up, and widespread use in the industry. A jet or flame of plasma from the torch 320 may be used to heat a hydrogen storage material from the source 340 and propel the heated material as the spray 335 that may be condensed and solidified to form a hydrogen storage nanomaterial 360.

The plasma gas source 310 is coupled with the torch 320. The plasma gas source may be a pressurized gas cylinder or other container. A plasma gas may be added to the torch 320 from its source 310 in order to form a plasma. Plasmas are well-known collections of charged particles containing substantially equal numbers of positive ions and electrons and exhibiting some characteristics of gases but differing from gases in being good conductors of electricity and in being affected by magnetic fields. Plasmas are often formed when atoms of a gas are excited to sufficiently high energy levels that they loose hold of their electrons and become ionised. A plasma may be formed by striking a direct current electric arc between a cathode and anode and flowing a gas through a nozzle to form the flame or jet of plasma. A magnetic field, gas injection, or radio-frequency generator may be used to stabilize the arc. The plasma provides a clean, and contaminant free source of heat for forming hydrogen storage nanomaterials. In addition to being clean, the plasma heat is intense, directional, and localized. The temperature of the plasma is often in the range of approximately 7,000-20,000° C. This range of temperature is higher than the boiling point temperatures of most materials.

Commonly used plasma gases include argon, nitrogen, helium, and hydrogen. Nitrogen and argon are commonly used primary gases. Argon is often desired as the primary gas because it is inert, not very corrosive to torch hardware, and readily forms plasmas. Nitrogen is also widely used and tends to be somewhat less costly. Nitrogen and argon are occasionally used by themselves. More commonly, nitrogen, argon, or a mixture of nitrogen and argon are mixed with one or more secondary gases. Commonly used secondary gasses are helium and hydrogen. The addition of helium may help impart good heat transfer characteristics. The addition of hydrogen in small quantities may help to act as an antioxidant and alter the plasma voltage and energy. The hydrogen is commonly employed in low concentration.

In some embodiments of the invention, the inventors contemplate including sufficient amounts of hydrogen in the plasma gas to reactively stabilize the nanomaterials. Without stabilizing the nanoparticles with hydrogen they may be unstable, highly reactive, and even pyrophoric. When removed from the chamber and exposed to air, for example, the particles may oxidize, or ignite spontaneously. This may be hazardous and may damage the nanoparticles. This may be avoided by providing a sufficient concentration of hydrogen, either in the gas used to generate the plasma or in the carrier gas, to combine with a significant proportion of the metal of the nanoparticles and form corresponding metal hydride. An insufficient amount of hydrogen would convert an insignificant stoichiometric proportion of the metal into metal hydride where a sufficient amount of hydrogen would convert a significant stoichiometric proportion of the metal into metal hydride. Substantially all of the metal may be converted into metal hydride, although this is not required, and it is sufficient to convert a subset that renders the material non-pyrophoric and non-hazardous when exposed to air. In various embodiments of the invention, enough hydrogen is provided to combine with in the range of approximately 50-100%, 75-100%, or 90-100% of the hydrogen storage material (e.g., convert these percentages of a metal into its metal hydride). In embodiments of the invention enough hydrogen is provided to combine with and stabilize at least a majority of the hydrogen storage material. Another advantage of including hydrogen is that the nanomaterial becomes charged with hydrogen and is ready for use as a hydrogen storing material.

The hydrogen storage material source 340 is coupled with the torch 320. The source 340 contains a hydrogen storage material. The hydrogen storage material may comprise a metal that is capable of combining with hydrogen to form a metal hydride. The term metal will be used to include pure metals (e.g., lithium, magnesium, etc.), mixtures or alloys of multiple metals (e.g., a sodium-aluminum alloy, a magnesium-nickel alloy, etc.), and mixtures or alloys of a metal and one or more non-metals. As an example of the later, sodium borohydride is a metal hydride containing sodium and boron, which is a metalloid. Another example is a metal containing silicon, which may combine with hydrogen to form silicon hydride ($SiH_4$).

The plasma spray system may be used for spraying different hydrogen storage materials. Examples of suitable metals that are capable of combining with hydrogen to from metal hydride hydrogen storing materials include, among others, alkali metals (e.g., lithium, sodium, etc.), alkaline earth metals (e.g., beryllium, magnesium, calcium, etc.), transition element metals (e.g., titanium, nickel, palladium, etc.), boron, aluminum, lanthanum or actinum series metals, and combinations thereof. The combinations may include one of these metals as an alloy or mixture with one or more other metals or non-metals. Specific metal hydrogen storage materials known in the arts include among others lithium, sodium, magnesium, magnesium-nickel alloy (e.g., $Mg_2Ni$), palladium, calcium, calcium-nickel alloy (e.g., $CaNi_5$), lanthanum-nickel alloy ($LaNi_5$), iron-titanium alloy (FeTi), and titanium-chromium alloy (e.g., $TiCr_{1.8}$). These alloys may respectively be used to form hydrogen storing materials lithium hydride (LiH), sodium hydride (NaH), magnesium hydride ($MgH_2$), magnesium-nickel hydride ($Mg_2NiH_4$), palladium hydride (PdH0.6), calcium hydride ($CaH_2$), calcium-nickel hydride ($CaNi_5H_4$), lanthanum-nickel hydride ($LaNi_5H_6$), iron-titanium hydride (FeTiH), and titanium-chromium hydride ($TiCr_{1.8}H_{1.7}$). Other suitable hydrogen storage compositions are doped and undoped sodium-aluminum alloys as described in U.S. Pat. No. 6,106,801 to Bogdanovic and copending U.S. Provisional Patent Application 60/395,013, entitled "Improved Methods For Hydrogen Storage Using Doped Alanate Compositions", by Craig M. Jensen and Scott D. Redmond, filed on Jul. 10, 2002. The U.S. Provisional Patent Application 60/395,013 is hereby entirely incorporated by reference. Of course many other hydrides are known in the arts (e.g., sodium magnesium hydride, sodiumborohydride ($NaBH_4$), lithium aluminum hydride, and lithiumborohydride ($LiBH_4$), potassium-rhenium hydride ($K_2ReH_9$), etc.).

The metal hydrogen storage material of some embodiments may include multiple different metal elements. The alloy may have different, often better, hydrogen storage and recovery characteristics compared to the pure metals. For example, it is known that the hydrogen recovery temperature of a $Mg_2Ni$ metal is approximately 50° C. less than that of a pure magnesium metal. This may be due in part to both nickel and magnesium surrounding the holes that are occupied by hydrogen in the metal hydride, which may change the binding energy, and due in part to the modification of the lattice structure of pure magnesium. Other metals such as scandium or copper may also be used. One potential drawback is increased weight of the metal and decreased hydrogen storage expressed as a weight percentage for the metal hydride. Accordingly, depending upon the hydrogen storage weight percentage goals of the particular implementation, such relatively heavy metals may be added in low concentration, or not at all. As another option, aluminum or another relatively low weight metal that has low affinity for hydrogen compared to magnesium may be used. For example, a magnesium-aluminum metal hydrogen storage material may be used. The aluminium may compete with hydrogen for the valence electrons of the magnesium, may help reduce the binding energy, may decrease the hydrogen recovery temperature, and without significantly decreasing the hydrogen storage weight percentage.

The hydrogen storage material may contain other components, such as dopants, catalysts, additives, and the like which modify, typically improve, its performance as a hydrogen storage material. As one example, the present inventors contemplate adding a small amount, for example a few weight percent, of one or more catalytically active transition metals that help catalyse either the addition or recovery of hydrogen to the material. Non-limiting examples of suitable transition metal catalysts include nickel, iron, vanadium, and palladium. Other transition metals may potentially also work. The dopants discussed in U.S. Provisional Patent Application 60/395,013 may also work. Without wishing to be bound by theory, these catalysts may help break hydrogen-hydrogen bonds to allow single hydrogen atoms to diffuse within a metal and form hydride.

Any of these or other hydrogen storage materials may be introduced into the hot plasma at a particular desired spray rate and heated. In some embodiments of the invention the hydrogen storage material may be added as a powder or other finely divided form. The powder or other finely divided hydrogen storage material may be introduced from a powder port, hopper, or feeder. The port, hopper, or feeder may have a distributor to deliver the powder into the plasma flame or jet. In the case of the metal hydrogen storage material being an alloy and containing a plurality of different elements, a single powder of the alloy may be used, or else a plurality of powders for each of the different elements may be used. As an example, to form a nanoparticle of a magnesium-nickel alloy, either a powder of a magnesium-nickel alloy, or separate powders of magnesium and nickel may be introduced into the plasma. It is contemplated that the former approach of adding a powder of a preformed alloy may provide nanoparticles of relatively more homogeneous or uniform composition. In the latter case of adding separate powders, the powders may be combined in amounts appropriate to give an alloy with the desired stoichiometry or relative proportion of the different elements. The separate powders may be introduced thorough a hydrogen storage material source that includes multiple tandem powder ports, operating in combination or partnership, to provide a desired stoichiometry for the hydrogen storage nanomaterial.

Alternatively, rather than a powder, the hydrogen storage material may be introduced into the plasma in the form of a wire, rod, cylinder, blocks, or other form. A bulk hydrogen storage material from the source and having one of these forms may be introduced directly into the plasma flame, jet, or arc. Alternatively, the hydrogen storage material source may include two electrically conductive wires, rods, cylinder, blocks, or other forms of bulk hydrogen storage material that may be heated and melted by an electric arc formed between them. For example magnesium-nickel alloy wires, or a magnesium wire and a nickel wire, may be melted with an electric arc formed between them. Fluids (e.g., gases, liquids, or slurries) are also suitable forms of hydrogen storage material. As an example, gaseous disilane ($Si_2H_6$) may be added to the plasma, potentially in combination with a powdered metal.

The hydrogen storage material added to the plasma is heated to a temperature greater than its melting point temperature, so that it becomes molten, and may be heated to a temperature greater than its boiling point, so that at least a portion of the material vaporizes. To illustrate non-limiting examples of the range of temperatures that may be employed, the melting point temperatures of lithium, magnesium, and palladium are respectively approximately 180° C., 650° C., and 1555° C., and the boiling point temperatures of these metals are respectively approximately 1342° C., 1090° C., and 2963° C. The vaporization may lead to further dividing or atomization of the hydrogen storage material. At the boiling point the individual atoms, or at least small groups of atoms, of the hydrogen storage material attain sufficient kinetic energy to break free of the bulk material as individual atoms. As previously discussed, the temperature of the plasma may be greater than approximately 7000° C., or even higher, so that the material may be heated to a controlled temperature by controlling system parameters. Whether the material is heated to the boiling point and vaporized may depend upon the initial temperature of the plasma, how much the plasma is cooled before introduction of the material, how much and how fast the plasma is cooled after introduction of the material, and other factors.

A number of operating parameters may be modified depending upon the particular material and its characteristics. Exemplary parameters include but are not limited to material feed rate, method of introduction of material into the plasma, power input and distribution, spatial configuration, gas flow rate, type and characteristics of quench gas, rate of quench gas flow, temperature variation, atmospheric pressure or vacuum, etc. It will be appreciated that plasma spray systems and their operation are well known in the art. Based on the present disclosure a person having an ordinary level of skill in the art may without undue experimentation adapt the operation of these systems to spray the materials disclosed herein and others that will be apparent. Moreover, it will be appreciated that such an effort, even if it happens to be time consuming, would nevertheless be a routine undertaking for those of ordinary skill in the art having the benefit of this specification.

The torch 320 is coupled with the spray cooling chamber 330. The heated hydrogen storage material within the plasma torch may be melted, atomized, and formed into the spray 335 within the chamber 330. The spray may contain atomized species (■), as well as nanoparticles (o), and clusters (*) produced by condensation of the atomized species. The atomized species may represent finely divided hydrogen storage material having a size that is not greater than that of a nanoparticle, or even individual hydrogen storage material atoms formed for example by vaporization. The finely divided hydrogen storage material may have an average molten droplet size that is not greater than approximately 100 nm, which may be significantly larger than the size of the powder that may be added to the plasma. As an example, the powder added to the plasma may have an average particle size greater than 10 microns. More commonly the average molten droplet size within the spray will be significantly smaller than 100 nm in order to allow for some condensation of these molten droplets during the cooling and solidification process. The nanoparticles and clusters may begin to appear after condensation of atomized material.

The high velocity flow provided by the plasma torch may help to atomize the molten hydrogen storage material. The material may also be atomized by vaporizing the hydrogen storage material with the heat of the plasma torch. Optionally, a compressed gas may be used to help finely divide or atomize the molten hydrogen storage material into a fine spray. The compressed gas may contact and shear the molten material into the atomized spray. The compressed gas may include an inert gas, for example nitrogen, argon, helium, other noble gases, or some combination thereof. A portion of the plasma gas, which may be pressurized gas from a source, may be diverted and used as the compressed gas. Alternatively, another inert gas such as nitrogen or argon may be used in a compressed form from a compressor or high pressure cylinder. An amount of hydrogen may be added to the compressed gas to convert some of the metal to a metal hydride. The molten metal as well as nanomaterials formed therefrom are reactive and readily combine with hydrogen to form metal hydrides. Alternatively, the hydrogen may be provided with the plasma gas, with the collision gas, after cooling and solidification of the particles, or some combination. Of course the metal may also be converted to metal hydrides after the nanomaterials have been removed from the plasma spray system, although it may be desirable to avoid or control contact of the particles with oxygen.

The spray 335 may be cooled within the spray cooling chamber 330 so the spray condenses to form the hydrogen storage nanomaterials 360. The cooling process may be carried but at normal atmospheric pressure and temperature often in a substantially inert atmosphere. The atmosphere may contain an amount of hydrogen to help convert the nanomaterials into hydrides. Alternatively, the process may be carried out in a vacuum with or without active cooling. If active cooling is desired, the cooling chamber may contain a cooling system, for example a cryogenic system incorporating a refrigerant, or tubes carrying cooling water.

The material within the spray may condense to form larger nanoparticles and/or clusters. Condensation refers to the conversion of a finely divided or atomized thermal spray into a less finely divided solid nanomaterial. Atoms or small particles may condense to form multiple atom structures or larger particles, and multiple particles may condense to form clusters. On cooling, the atoms and small particles may condense to form nanoparticles clusters of various sizes by aggregation and/or agglomeration. The nanoparticles may be condensed so that each nanoparticle contains between approximately 10-1000, or 10-5000 atoms in order to provide a relatively high ratio of surface exposed atoms to interior bulk atoms compared to bulk materials. Larger particles having approximately 100,000,000atoms are still more effective compared to bulk materials. To further illustrate the concept, at least conceptually, the condensation may be similar to the soot formation process in conventional combustion flames. As the distance from the hot center of the flame increases, the flame combustion gases begin to cool and condense to form soot particles that can be seen in the rising smoke. A roughly analogous condensation process may occur in plasma flames.

The condensation process may at least conceptually involve two phases. During an initial phase, single or small groups of metal atoms dominate the vapour and the principal mechanism of cluster growth is condensation or combination of either the single metal atoms or single metal atoms with existing aggregates. Within this phase, individual atoms may begin to nucleate into clusters. This often occurs slowly. At some point, the rate of addition of atoms to existing aggregates surpasses the rate of new aggregate nucleation, due in part to the larger reaction cross section of the existing aggregates, and the clusters may continue to grow in size. The second phase begins when relatively few individual atoms and small clusters remain and the principal mechanism for particle growth is due to combination of multiple atom aggregates with one another. The particles rapidly increase in size during this phase. The condensation process may be operated so that a typical or average-sized nanoparticle has a desired size. A majority of these nanoparticles may be sphereoidal giving a large surface area to mass ratio. The small size, sphereoidal shape, purity of composition, may help allow nearly complete recovery of hydrogen. As desired, the nanoparticles may be employed as compositions of their natural particle size distribution, or a particular subset particle size distribution, or range may be isolated by using conventional solid particle separation techniques.

In the particular system illustrated, the collision gas source 350 is coupled with the spray cooling chamber 330, although this is not required. A collision gas may be provided from its source 350 into the spray 335. The collision gas will be used herein to refer to a gas that collides with and contacts the spray. The collision gas may have a lower temperature than the spray and may be used to cool the spray (e.g., as a quench gas). The collision gas may contain inert gases such as nitrogen, argon, helium, other noble gases, or some combination thereof. The collision gas may also help to slow the momentum of the spray, and perhaps cause the nanomaterials to gravity settle within the chamber. In embodiments of the invention, the collision gas may, contain an amount of hydrogen to combine with the spray of the hydrogen storage material to form a hydrogen storing material. In other embodiments of the invention the spray may cool naturally.

The solidified and cooled hydrogen storage nanomaterial may be collected. In various embodiments of the invention, the nanomaterial may be filtered out for example with an electrostatic filter, settled in the bottom of a chamber (e.g., the spray chamber or a larger settling chamber) due to gravity settling, or otherwise collected. In embodiments of the invention, the collected material may be added to a powder port, hopper, or feeder, and loaded into cassettes or other containers that pass by on a conveyor belt.

Alternatively, rather than a plasma spray process, another suitable thermal spray process is a flame spraying process in which an oxygen fuel gas flame is uses to heat and often melt a coating material and a gas flow, for example from a compressed gas or from the convective effects of the flame, may be used for propelling the coating material to the support. An example of a flame spraying process is an HVOF (high velocity oxygen-fuel) spraying process wherein the coating material, for example in the form of a powder, is injected into a high velocity jet, formed by the combustion of oxygen and fuel, that heats the coating material and propels it toward the support. Yet another suitable thermal spray process is an arc spraying process in which an arc between two consumable electrodes of coating materials is used as a heat source and a gas flow (e.g., a compressed gas) is used to extract divided portions of the coating material and propel the portions to the support. An example of an arc spraying process is an arc wire spraying process wherein two electrically conducting wires are brought together to form an electric arc and molten material formed in the arc is projected by a compressed gas stream towards the support to form a spray deposit. Of course, these thermal spray processes may be combined and modified.

Plasma spray systems and other types of thermal spray systems are commercially available from numerous sources. As an example, new and used plasma, HVOF, oxy/fuel combustion, and dual wire arc thermal spray equipment is commercially available from PLASMATEC Inc. of Montreal, Canada. PLASMATEC also provides metal powders and wires for use in thermal spray systems. More information is currently available online from the website: www-.plasmatec.com. Arc spray, detonation, flame spray, HVOF, and plasma spray systems are also commercially available from A-Flame Corporation of Cincinnati, Ohio. In particular, A-Flame offers a plasma spray system including a DS-2 Control Console, DXR80 Power Supply, AMP-3 Powder Feeder, A9-Gun, Complete 9MB Style 80kw Gun, Model 90 Water Chiller, and AFH-50 Hose & Connection Kit along with installation and training. More information is currently available online from the website: www.aflame.com. Of course the inventors have no special preference for these vendors and thermal spray systems may also be obtained from other vendors, as desired.

Of course, it will be apparent to those having an ordinary level of skill in the art and the benefit of the present disclosure that numerous other techniques may be used to form the hydrogen storage nanomaterials. Other gas phase condensation processes that are suitable include, among others, laser vaporization and condensation of a solid material, and such physical vapor deposition techniques as thermal evaporation, sputtering, and molecular beam epitaxy. Virtually any metal capable of forming metal hydrides with hydrogen may be ablated, for example with a laser or focused ion beam, in order to form nanomaterials and nanoparticles. U.S. Pat. No. 6,368,406 to Deevi et al. describes a process of making intermetallic nanoparticles of alloys such as iron aluminides (e.g., FeAl, $Fe_3Al$) nickel aluminide (e.g., NiAl), titanium aluminide (e.g., TiAl) and other intermetallic compounds such as brass and iron-cobalt-vanadium alloys. Starting materials such as metal alloys for these alloys are subjected to laser energy sufficient to vaporize the starting materials. The laser energy used was the second harmonic of a Nd-YAG laser operated at 532 nanometers with 15-40 mJ/pulse. The vaporized materials are then condensed to form the intermetallic nanoparticles. This approach may be used to form particles having diameters that are less than approximately 100 nanometers. This approach is suitable for forming hydrogen storage nanoparticles, according to embodiments of the invention.

Gas phase thermal decomposition processes may also be used. In a gas phase thermal decomposition process a precursor material is decomposed, condensed, and solidified to form a nanomaterial. An exemplary gas phase thermal decomposition may include decomposing a liquid precursor material, such as $Fe(CO)_5$ to form a particle containing a metal that is capable of combining with hydrogen to form a metal hydride (in this case iron). The gas phase thermal decomposition may be performed in a furnace, or with the energy provided by a laser. Experiments by the inventors indicate that Pulsed Laser Vaporization (PLV) may be used to form hydrogen storage nanomaterials. PLV is a laser vaporization technique known in the arts for forming nanoparticles and thin coatings on support. PLV involves irradiating a precursor material with a laser in order to evaporate the material, and then condensing the vapor to form the nanoparticles. Thermal spray processes may be desired over PLV when forming large quantities of nanomaterials.

The present inventors have generated high nuclearity ligated metal clusters or cores containing tens to hundreds of metal atoms by thermally decomposing organo-metallic precursor materials with PLV. A high nuclearity metal cluster containing up to several hundred metal atoms in a close packed cluster or core within a sheath of hydride and/or carbonyl ligands may be formed by using PLV to thermally decompose a corresponding metal-hydride-carbonyl precursor material. For example, in one set of experiments, the ruthenium cluster $[Ru_xH_y(CO)_z]^{+/-/0}$, in which x is an integer in the range of approximately 8-400 and is often a multiple of 4, was formed by using PLV to thermally decompose the organo-ruthenium precursor $[Ru_4(CO)_{12}H_4]$. The hydrogen and carbonyl groups typically, under the conditions used, form a ligand sheath around the metal cluster in which y and z are both integer values in the range of approximately 12-400, and are often of a similar magnitude, or at least the same order of magnitude, as that of x. Often, the ligand number to metal ratio decreases with growth of metal core size inasmuch as the CO ligands are primarily positioned at the surface. Some hydrides may be positioned in the metal lattice. Also, the need for stabilisation from ligands of the metal atoms is reduced for larger metal cores. The ratio of surface metals to ligands comes down to approximately 1:1 when decreasing the metal to surface ratio on increasing the core size. A pulsed ultraviolet nitrogen laser beam at 337-nanometers and with a laser power density of approximately 106 Watts/cm2 may be used, although this is not required. The pulsed laser may be operated with a laser pulse width in the range of approximately 300 picoseconds to 3 nanoseconds, and the laser energy may be in the range of approximately 10 uJ to 10 mJ. Of course the method is not limited to ruthenium and may also be used on other metals. Non-limiting examples of other metals include iron (Fe), osmium (Os), iridium (Ir), rhodium (Rh), and combinations thereof. Exemplary organo-metallic precursors for these metals may have the formula $[M_xH_y(CO)_z]$, where M represents one of these metal atoms, x is an integer in the range of approximately 1-5, y is often either 2 or 4, and z is often either 12 or 13, of course other organo-metallic precursors are suitable and many different combinations have been tested.

II. Particle Supports Having Hydrogen Storage Material Deposits

The invention of embodiments encompasses hydrogen storage system comprising a support, for example a microparticle or nanoparticle, having a hydrogen storage material deposited thereon. One exemplary support and deposit comprise a fly ash particle having a thermal spray deposit formed thereon of a metal that is capable of combining with hydrogen to form a metal hydride (e.g., lithium). The invention of other embodiments encompasses a method for forming the hydrogen storage system by depositing the hydrogen storage material on the support by thermally spraying the deposit on the support. In one aspect, the support may be introduced into a thermal or plasma spray of hydrogen storage material so that the spray deposits on the support. The invention of other embodiments encompasses recovering hydrogen from the hydrogen storage material deposit by heating the deposit. The recovered hydrogen may be provided to a hydrogen utilization system, such as a fuel cell, a hydrogen powered vehicle, or others known in the art.

Figure 4:
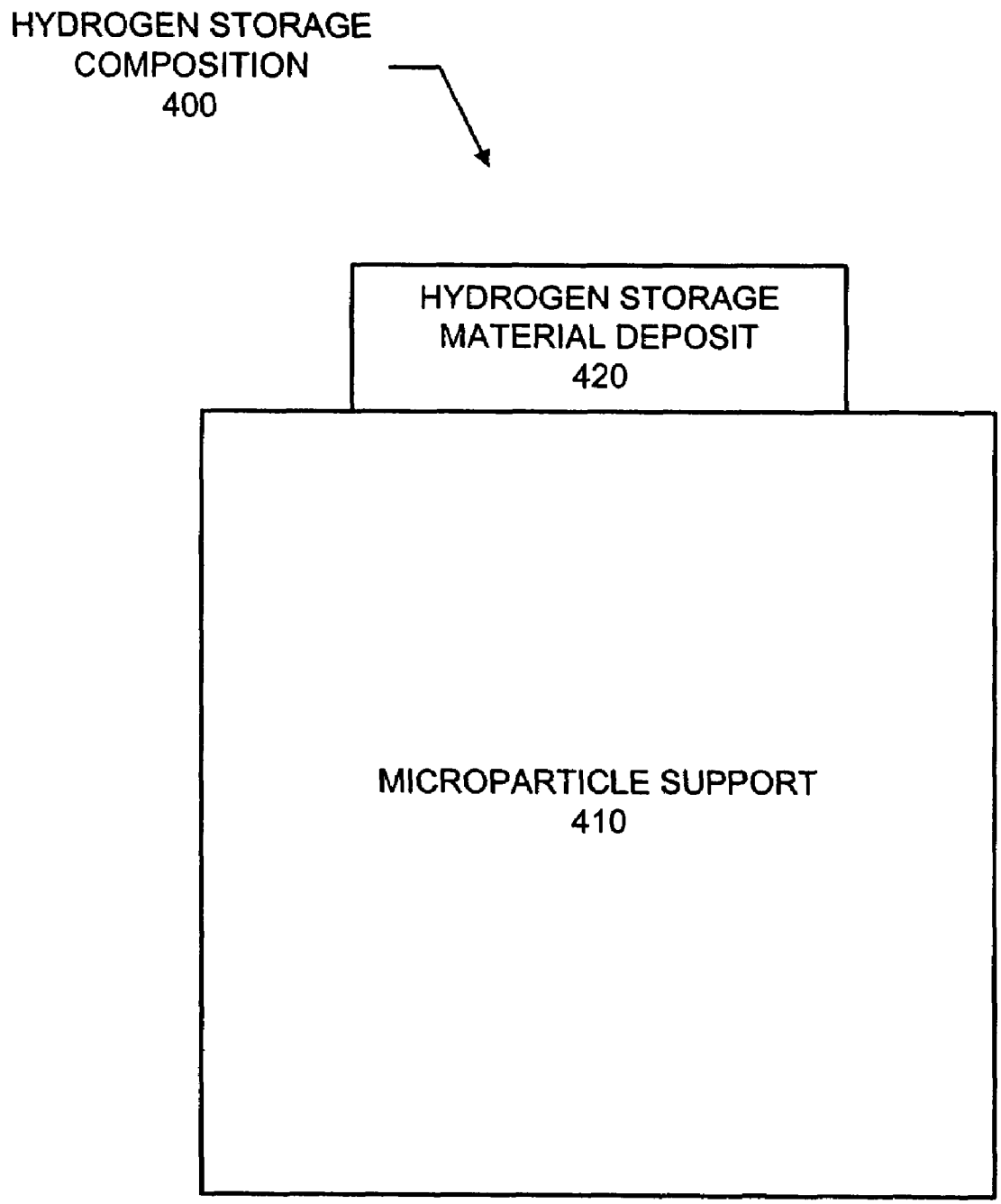
FIG. 4 shows a hydrogen storage composition containing a hydrogen storage material deposit on a support, according to embodiments of the invention.

FIG. 4 shows a hydrogen storage composition 100 containing a hydrogen storage material deposit 420 on a support 410, according to embodiments of the invention. The hydrogen storage material deposit may comprise a deposit containing a metal that is capable of forming a metal hydride by combining with hydrogen. One advantage of depositing the material on the support is improved dispersion and utilization of the hydrogen storage material. By coating the support with the deposit a higher percentage of the metal of the deposit may be exposed at the surface instead of concealed within the interior bulk where it may be less useful for storing hydrogen.

The support may represent any particle or other minute substrate to which the deposit may be applied. In some embodiments of the invention the support may comprises a micro-sized particle. As used herein, the term micro-sized particle will be used to refer to a particle having a size ranging from less than approximately 1 millimeter (mm, one-thousandth of a meter) to more than approximately 1 micrometer (um, one-millionth of a meter). A micrometer is also known as a micron. Desirably, the support provides a high surface area, is inert, and is sufficiently cost effective for the particular implementation. In various embodiments of the invention, the support may comprise glass materials, glass beads, glass microspheres, hollow glass microspheres, oxides of silicon (e.g., silica), glass ceramics, ceramic materials, ceramic microspheres, hollow ceramic microspheres, oxides of aluminum (e.g., alumina), pozzolan particles, fly ash particles, fly ash particles having a substantial internal void, mesoporous materials (e.g., MCM-41, MSU-3/KIT-1, JDF-20, cloverite, VPI-5, AMM Faujasite, DAF-1, MAPO-36, beta, STA-1, ZSM-5/TS-1, DAF-4), zeolites, metal oxide materials, iron oxide particles, carbon nanostructures, carbon nanotubes, polymer materials, polymer beads, polystyrene microspheres, hollow polymer microspheres, etc. These supports are commercially available from numerous sources. Many supports for platinum and other catalysts in the chemical processing industries may potentially be used. As used herein the term sphere may be used to refer to a sphere as well as a spheroid that does not necessarily have a perfectly spherical shape. Of course the supports may also have rod, sheet, or potentially any other regular or irregular shape. The support may be crushed, ground, or otherwise formed into particles.

Pozzolan materials offer one suitable support for deposition of hydrogen storage materials. As used herein, the term pozzolan material will be used to refer to a finely divided siliceous or siliceous and aluminous material. Pozzolans are often used in cement manufacture although as used herein a material may be pozzolan regardless of its cementitious properties. Non-limiting examples of pozzolans include silica fume volcanic ash, calcined clays, amorphous silica, and fly ash. Pozzolans may be naturally occurring, as in the case of volcanic ash, or man made as in the case of coal fly ash that is produced as a byproduct of coal combustion. As discussed, these pozzolans are often used in cement manufacture among other uses and are commercially available from numerous sources.

Fly ash has a number of properties that make it a suitable support for a hydrogen storage material. As is well known, coal fly ash contains residual particles of soot or ash that remain after combustion of pulverized coal fuel and that is often separated from the flue gases in the stacks of power plants by separators such as electrostatic precipitators, FGD devices, or bag houses. Fly ash is produced in enormous quantities worldwide as a byproduct of pulverized coal combustion, is cheap, abundant, and available from numerous sources including from power plants. One suitable source of fly ash is Ameren Corporation of St. Louis, Mo. The practitioner may consult the American Coal Ash Association (ACAA) for assistance in locating fly ash suppliers and other information related to the use of coal combustion by-products such as coal fly ash.

Fly ash has the appearance of a finely divided powder with a light to dark gray or brown color. The size, shape, appearance, and composition of fly ash particles is quite variable and depends upon the source and uniformity of the coal, the degree of pulverization prior to combustion, and the type of collection system used. Although the particular characteristics are quite variable, and depend upon these numerous factors, the particles are often generally spheroidal (not necessarily perfectly spherical), have a size that is often in the range of approximately 0.5-250 micrometers (um, one-millionth of a meter). The small size and spheroidal nature of fly ash particles gives them a large surface area for hydrogen storage, per unit volume. Of course the invention is not limited to spheroidal particles and particles having other shapes (e.g., cubes, rods, sheets, etc.) may also be used. As an option, conventional separation techniques may be used to remove fly ash particles that are either larger, or smaller, than a particular desired particle size distribution. Such separations may be desired in order to obtain more uniform particles for ease of processing, packing, or otherwise. Fly ash particles commonly have a melting point temperature that is greater than approximately 1000° C.

The particles of fly ash often contain a complex mixture of primarily inorganic constituents whose nature and proportions depend to a large extent upon the coal from which the fly ash was formed and upon the conditions of combustion. Common constituents of fly ash include but are not limited to silicon dioxide ($SiO_2$), aluminum oxide ($Al_2O_3$), iron oxide ($Fe_2O_3$), calcium oxide (CaO), magnesium oxide (MgO), potassium oxide ($K_2O$), sodium oxide ($Na_2O$), alkali sulfates. These constituents often take the form of an amorphous glass due to rapid cooling of the fly ash post combustion. Two common forms of fly ash are Class-C and Class-F fly ashes. Class F fly ash often has quartz, mullite, hematite, and magnetite spinel as crystalline phases within the glass. One exemplary high iron Class F fly ash from Eastern Canadian bituminous coal contains approximately 58% glass, 9.6% quartz, 20.4% mullite, 4.5% magnetite spinel, 5.4% hematite, and trace amounts of other components. Class C fly ash may contain these components as well as anhydrite, alkali sulfates, dicalcium silicate, tricalcium aluminate, lime, melilite, meriwinite, periclase, and sodalite. One exemplary low-calcium Class C fly ash from western Canadian subbituminous coal contains approximately 80% glass, 14% mullite, 6% quartz, and trace amounts of other components.

A fraction of fly ash particles, sometimes referred to as cenospheres, contain an internal void. These fly ash particles are often sphereoidal (not necessarily a perfect sphere) and have one or more internal voids, gas bubbles, or air pockets. The gas bubbles may get trapped or frozen in the molten fly ash material as it solidifies and cause the overall particle to have a lower density. Cenospheres with large voids or gas bubbles have a density that is less than approximately 1 $g/cm^3$ (the fraction of such particles is usually around 1-20%) whereas cenospheric particles with smaller voids or bubbles have a density that is less than approximately 2 $g/cm^3$ (the fraction of such particles is usually in the range of approximately 10-90%). As used herein, a cenosphere or fly ash particle with a density not greater than approximately 2 $g/cm^3$ may be referred to as a fly ash particle having a substantial internal void. A particle of the same type of material without an internal void would have a density of approximately 3 $g/cm^3$, or higher. As a result of the lower density, cenospheres have lower weight at the same external surface area compared to non-cenosphere fly ash particles, which may be desired in order to reduce the weight of the hydrogen storage material. In some embodiments of the invention, cenospheres may be separated for further use, or the proportion of cenospheres in the fly ash increased, by removing non-cenosphere particles from the fly ash. The separation may be based on the density difference, for example by floating cenospheres on the surface of water and settling non-cenospheres by gravity, or by other known separation technologies. One suitable approach for separating cenospheres by floatation is disclosed in U.S. Pat. No. 5,227,047. In some embodiments of the invention the cenospheres, as well as other particles in general, may be broken prior to coating, for example by crushing or grinding, in order to expose the internal surface areas and use them as supports for a hydrogen storage material.

Fly ash particles are often associated with coal, although soots or ashes resulting from the combustion of other finely divided or pulverized carbonaceous fuel particles or droplets such as peat, petroleum tars, and the like may also be suitable. U.S. Pat. No. 4,431,520 discloses carbonaceous combustion particles and cenospheres produced by the combustion of heavy liquid hydrocarbons and oils. Additionally, other coal combustion byproducts, such as crushed or ground boiler slag or bottom ash particles, may also potentially be used.

MCM (Mobile Crystalline Material)-41 is one example of a mesoporous molecular sieve that may provide a suitable support and substrate for deposition of a hydrogen storage material deposit. MCM-41 is an amorphous silica or alumosilicate structure with arrays of non-intersecting hexagonal honeycomb-like channels or pores. Deposits may be formed within these channels or pores in order to provide improved surface area. In addition, the openness of the material reduces the weight per surface area, which may be desired in order to reduce the weight of the hydrogen storage material.

Many other supports may also be used. In general, the support should provide a high surface area to weight ratio, be relatively inert, and be stable under deposition and hydrogen recovery conditions. Supports for platinum and other catalysts are suitable. Examples of such supports include but are not limited to powdered activated carbon (C), oxides of aluminum (e.g., alumina, $Al_2O_3$), oxides of silica (e.g., silica, $SiO_2$), silica-alumina, carbon black (C), oxides of titanium titania (e.g., titania, $TiO_2$), oxides of zirconia (e.g., zirconia $ZrO_2$), calcium carbonate ($CaCO_3$), and barium sulphate ($BaSO_4$). These supports are commercially available from numerous sources.

A hydrogen storage material may be deposited on a support. Suitable deposition processes include gas phase condensation process and physical deposition processes (e.g., sputtering, thermal evaporation, etc. The inventors presently favor thermal spray processes, for example plasma spray processes or arc spray processes. In such processes the hydrogen storage material is spray deposited on the support. The spray deposit may be a single thin flattened sprayed particle also known as a "splat", or a deposited layer. The spray deposit may take the form of a discrete crystallite on the support surface. Commonly, the material is formed directly on the exterior surface of the particle although one or more additional materials may be disposed in between the hydrogen storage material and the particle, as desired.

Figure 5:
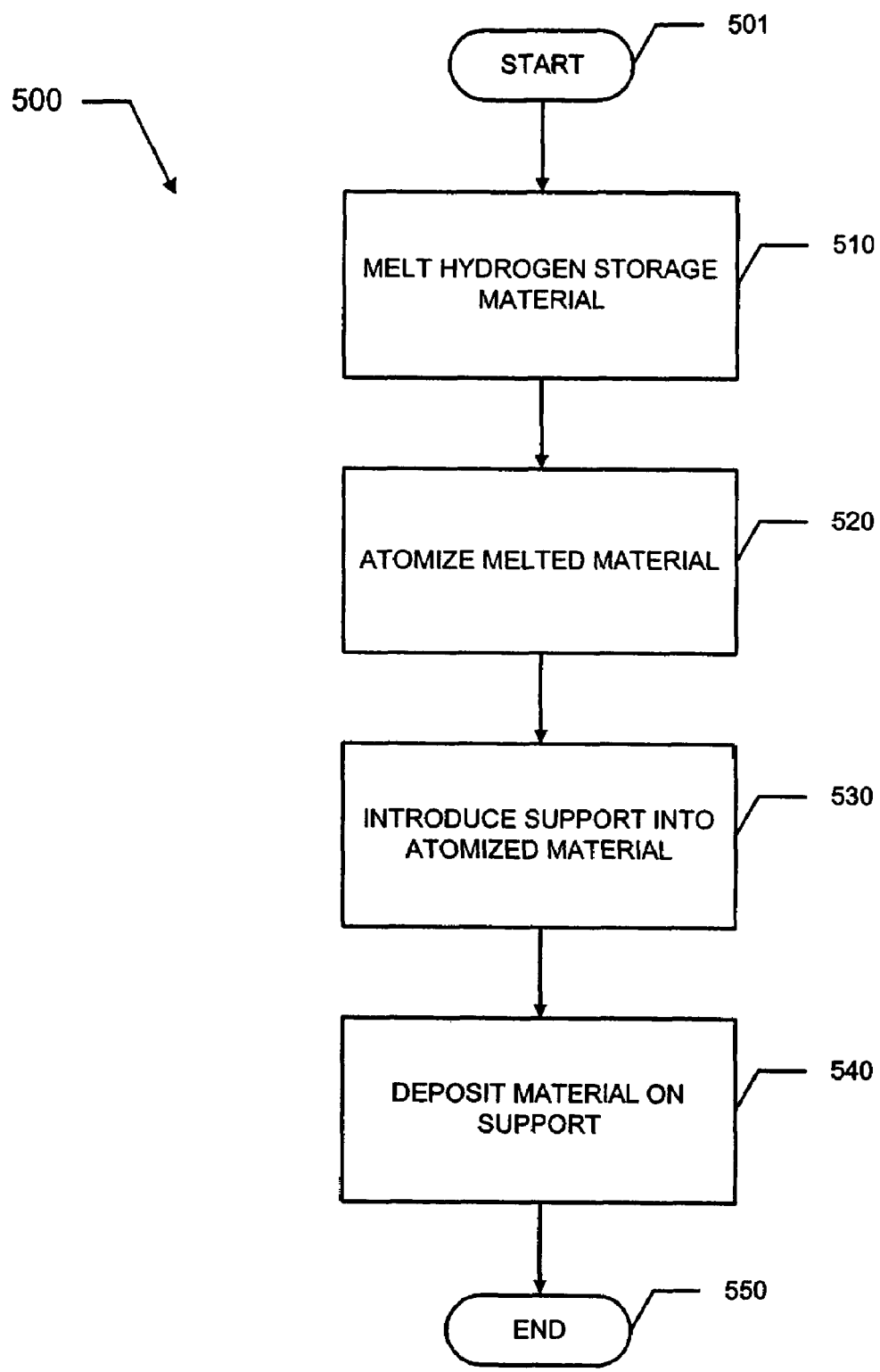
FIG. 5 shows a method for depositing a hydrogen storage material on a substrate according to embodiments of the invention.

FIG. 5 shows a method 500 for depositing a hydrogen storage material on a substrate according to embodiments of the invention. After initiating at block 501, a hydrogen storage material may be melted at block 510. Initially, a hydrogen storage material may be added to a thermal spray system at a particular desired spray rate. Often the material may be added in powdered or other finely divided form, although this is not required. Other forms that are suitable include wires, rods, blocks, and other forms known in the arts. The material added to the thermal spray system may be heated to a high temperature above its melting point wherein it may melt.

Next, the melted material is atomized at block 520. A compressed gas may be used to divide or atomize the molten material into nanoparticles, small groups of atoms, or individual atoms, although this is not required. If the material is heated to its boiling point temperature, vaporization may further assist with atomizing the material. Fine atomization of the melted material may be desired when depositing very small nanometer-scale deposits.

Then, the support is introduced into the atomized material at block 530. The melted material may be propelled as a spray toward a support positioned for impact with the thermal spray. As a first example, the support may be added as a powder into the spray. The powder may be added at a particular predetermined distance from the plasma flame or jet. As another example, the support may be added as a powder carried by a collision gas such as that discussed in regards to FIG. 3. The collision gas, may carry the support into the spray. As yet another option, the support may be thermally sprayed into the previously discussed thermal spray. Two thermal sprays may be formed simultaneously on a collision course, for example by using two plasma torches directing their sprays towards one another and separated by a predetermined distance. Support particles may condense from a first of the sprays and metal from a second of the sprays may condense on the support particles. Of course, the condensing support and metal sprays may also form an aggregate of metal and support condensing species.

The material is deposited on the support at block 540. A molten droplet of the spray, or a condensation product (e.g., a nanoparticle formed from a combination of atomized material, or a cluster of nanoparticles) may strike the substrate and deposit thereon. The surface coverage of the thermal spray deposits and other characteristics may depend on various system parameters such as type of hydrogen storage material, collision gas velocity, spray distance, collision gas temperature, amount of support per thermal spray amount, etc. The amount of material deposited on the support, for example the number of spray deposits, or the thickness of the layer, may be adjusted or controlled based on the relative amounts of hydrogen storage material and support that are added to the system. As an example, the number of deposits per fly ash particle may be increased, approximately doubled, by doubling the amount of hydrogen storage material added to the thermal spray system per fixed amount of fly ash particles. As desired, deposits may be sprayed onto the support until a substantially continuous coating or layer is obtained in order to provide a high surface area for hydrogen storage per unit volume. Of course, the substantially continuous coating may contain some gaps where splats have not occurred. The coating will typically have a thickness that is not greater than approximately 10 nanometers. Of course, some regions may have a larger thickness, for example where splats overlap. Often a thin enveloping coating or layer having a thickness not greater than several molecular dimensions, for example a thickness not greater than approximately 2 nanometers, may be desired in order to effectively use hydrogen storage material and a reduced loss of hydrogen to the sub-surface.

As previously discussed, one of the significant problems encountered with many hydrogen storage materials, such as metal hydrides, is an effective loss of hydrogen to the material sub-surface. Accordingly, providing a larger proportion of the hydrogen storage material at the surface allows easier, lower temperature, and more complete hydrogen recovery. Additionally, the thinner coatings often reduce costs of the hydrogen storage composition, inasmuch as many hydrogen storage materials (e.g., magnesium, nickel, etc.) are costly. The high surface area and large percentage of metal exposed at the surface may additionally speed up hydrogen charging times, which may otherwise be slow due to slow diffusion of hydrogen through the internal lattice structure of the bulk metal. Accordingly, the hydrogen storage material deposit may alleviate many of the prior art problems associated with bulk hydrogen storage materials.

Figure 6:
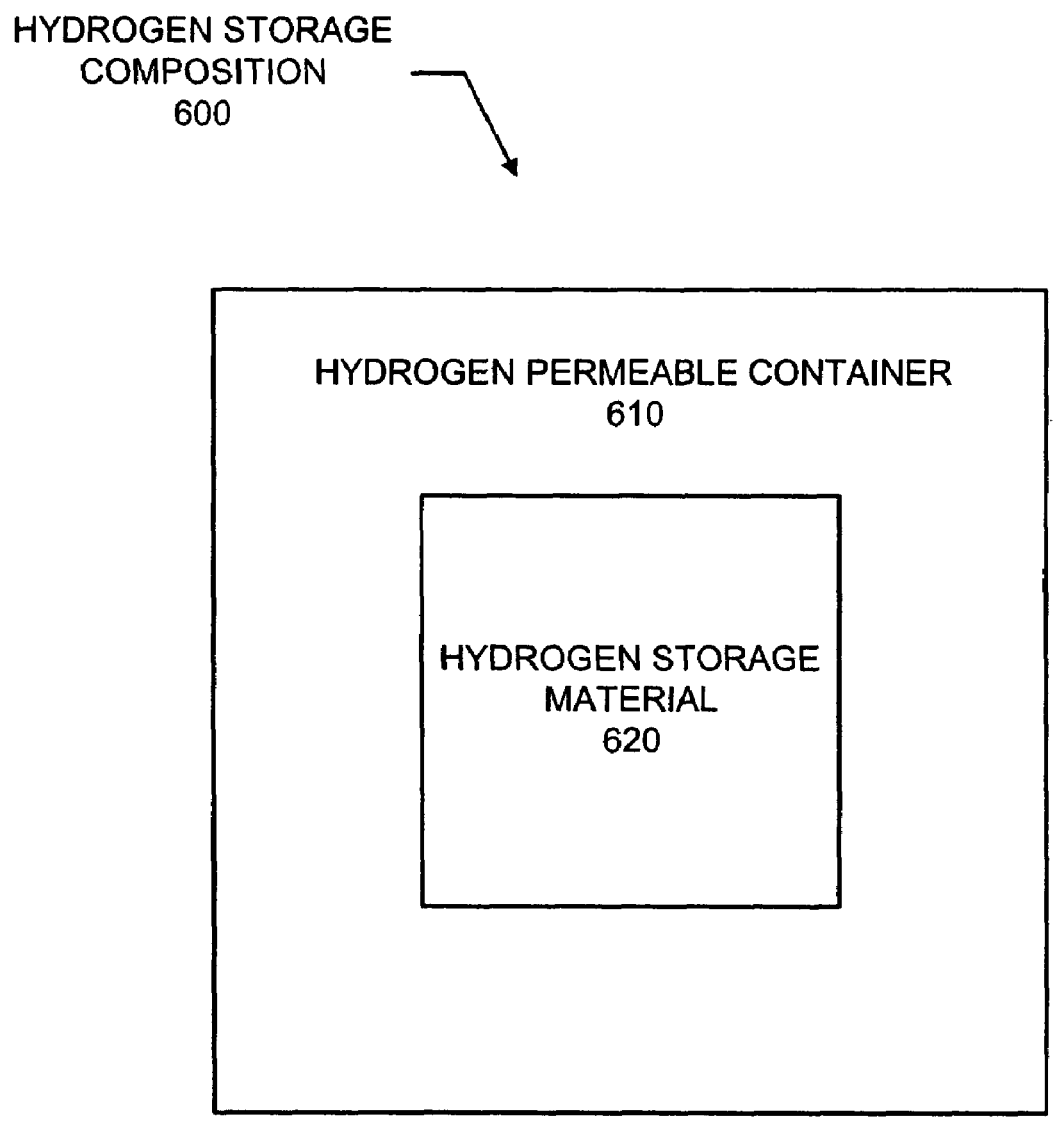
FIG. 6 shows a hydrogen storage composition containing a hydrogen permeable container having a hydrogen storage material contained therein, according to embodiments of the invention.

III. Hydrogen Permeable Containers Having Hydrogen Storage Material Contained Therein Embodiments of the invention encompass a hydrogen permeable container having a hydrogen storage material (or hydrogen storing material) contained therein. FIG. 6 shows a hydrogen storage composition 600 containing a hydrogen permeable container 610 having a hydrogen storage material contained therein, according to embodiments of the invention. In some embodiments, the containers may have a hydrogen storage material that has been permeated into an interior void thereof. In other embodiments, the containers may have an enclosing layer that has been formed over the hydrogen storage material.

A. Containers Having Hydrogen Storage Material Permeated Therein

Embodiments of the invention encompass a hydrogen permeable container having a hydrogen storage material that has been permeated into an interior void thereof. In some embodiments, the container includes a microparticle having an internal void that has been impregnated with a hydrogen storage material by permeating the material into the void. The hydrogen storage material may comprise a metal that is capable of combining with hydrogen to form a metal hydride. As an example, lithium or lithium hydride may be contained within an internal void defined within a hollow microsphere (e.g., a fly ash particle having a substantial internal void). The invention of this embodiment also encompasses a method of forming a hydrogen storing material within the micro-sized hydrogen permeable container by permeating the material into the container. The container may have walls that are sufficiently permeable, at least when heated, to allow the material to permeate across the walls and into the void. The material may include a substantially small and light metal such as lithium, beryllium, boron, sodium, magnesium, aluminum, or a combination thereof. As an example, lithium may be permeated into the void of a heated fly ash particle. Hydrogen may be permeated into the interior void of the container and may be combined with the hydrogen storage material (e.g., the lithium) to form a hydrogen storing material (e.g., lithium hydride). That is, one example of forming a hydrogen storing material within the container includes permeating a hydrogen storage material through the hydrogen permeable container and into the interior void and permeating hydrogen through the container and combining the hydrogen with the hydrogen storage material. Other embodiments encompass recovering hydrogen from the container by heating the material within the container and permeating thermally recovered hydrogen from the container.

A number of hydrogen permeable containers are suitable including microparticles having one or more internal voids. Exemplary microparticles having one or more internal voids include glass microspheres that are conventionally used for hydrogen storage, fly ash particles that have a substantial internal void (or voids) which cause them to have low density (e.g., a cenosphere), hollow polymeric microspheres, and hollow metal microspheres. Glass microspheres are commercially available hollow glass spheres having walls that are permeable to hydrogen when appropriately heated. In traditional use the glass microspheres may be charged with hydrogen by heating them in a high pressure hydrogen ambient in order to cause the hydrogen to permeate into the interior. Once filled, the spheres may be cooled to lock the hydrogen inside. Subsequently, hydrogen may be recovered by reheating the spheres and allowing the hydrogen contained therein to permeate out of the hollow interior. Glass microspheres are commercially available from numerous sources. Suitable hollow microspheres include the 3M™ Zeeospheres™ Ceramic Microspheres available from 3M Specialty Materials, of St. Paul, Minn. The Zeeospheres™ are hollow microspheres available in silica-alumina ceramic and alkali alumino silicate ceramic compositions. The microspheres are available in different sizes in the range of approximately 1-200 microns. Other suitable hollow glass microspheres include hollow glass beads, at diameters in the range of approximately 2-20 microns, available from Polysciences, Inc., of Warrington, Pa.

Fly ash particles having substantial internal voids have been discussed above and are also commercially available. Extracted fly ash cenospheres are commercially available from Trelleborg Fillite Ltd a subsidiaries of Trelleborg AB of Sweden. Hydrogen storage materials may be added to the internal voids of these fly ash particles or glass microspheres by heating the materials and permeating the hydrogen storage materials into their internal voids.

Hollow organic or polymeric microspheres are also suitable. Suitable hollow polymeric microspheres include hollow phenolic beads having a size in the range of approximately 5-127 microns that are available from Polysciences, Inc. of Warrington, Pa. Other suitable hollow polymeric microspheres include thermoplastic hollow microspheres that are available from Pierce & Stevens Corporation (a subsidiary of Sovereign Specialty Chemicals, Inc.), of Buffalo, N.Y. In particular, DUALITE® microspheres comprise a thermoplastic hollow microsphere coated with calcium carbonate, and MICROPEARL® microspheres are not coated with the calcium carbonate. The microspheres come in sizes ranging from approximately 40-150 microns and have heat resistance to approximately 175° C. Hollow metal microspheres may also be used. A method and apparatus for producing hollow metal microspheres and microspheroids are discussed in U.S. Pat. No. 4,415,512.

A variety of hydrogen storage materials are suitable. Any metal that is capable of combining with hydrogen to form a metal hydride may potentially be used. Exemplary metals have been discussed above and include among others alkali metals, alkaline earth metals, boron, aluminum, magnesium-nickel alloy, undoped sodium-aluminum alloy, doped alanate compositions, and others that have been mentioned. The hydrogen storage material may be added to the void by permeating the material across the walls of the fly ash particle or glass microsphere into the interior void. As used herein, the term permeate and the like will be used to refer to a material diffusing through or penetrating the walls of the fly ash perticle, glass microsphere, or other container. Diffusion is a well-known process. The rate of diffusion increases with increasing temperature and decreases with increasing size of the diffusing species (e.g., atoms of a hydrogen storage material). In some embodiments of the invention, substantially small or light metals may be favored over heavier metals due to the increased rates of diffusion or permeation of these materials through the container and into the void and due to the relatively high hydrogen storage weight percentages for their hydrides. Accordingly, a substantially light metal may be selected from the group lithium, beryllium, boron, sodium, magnesium, aluminum, or a combination thereof. The weight of these metals is in increasing order from lithium to aluminum. As one metric for the size of the metals, the calculated atomic radii is approximately as follows: 167 for lithium, 112 for beryllium, 87 for boron, 190 for sodium, 145 for magnesium, and 118 for aluminum. Of course, heavier metals may also be used, or may be used in combination with the lighter metals, as desired.

The container may be contacted with a hydrogen storage material at a temperature that is sufficiently high to allow the material to permeate the walls and enter the container. In general, the higher the temperature the higher the diffusion and permeation of the hydrogen storage material across the container walls. The temperature should be lower than the melting point temperature of the structural material of the container to avoid deforming the container. Often a relatively rapid rate of permeation may be obtained at a temperature just below the melting point of the container. Desirably, the hydrogen storage material is in liquid or vapor state in order to provide good contact with the container. Accordingly in embodiments of the invention, the hydrogen permeable micro-sized container may be contacted with a liquid or vapor of a hydrogen storage material that has been heated to a temperature that is greater than the melting point temperature of the hydrogen storage material and that is less than the melting point temperature of the structural material of the container in order to permeate the material into the internal void thereof.

As one illustrative example, consider permeating sodium into the internal void of a fly ash particle. Sodium has a relatively small size and weight. This allows for high percentages by weight hydrogen storage in sodium hydride and allows sodium to diffuse and permeate materials relatively rapidly. Sodium has a melting point of approximately 97° C. and a boiling point of approximately 883° C. Fly ash particles often have a melting point temperature that is greater than approximately 1000° C. Since the boiling point of sodium is lower than approximately 1000° C., the fly ash particles may be filled by exposure to sodium vapor. The melting and boiling points of other metals are widely available and known in the arts. The sodium may be heated to its boiling point at around 883° C. and vaporized. The fly ash particles may be contacted with vaporized sodium. As an example, the fly ash particles may be supported in a packed bed and vaporized sodium, at a temperature greater than approximately 883° C. and lower than the melting point temperature of the fly ash particles, may be passed through the bed. The sodium will contact the walls of the fly ash particles, begin to permeate the walls of the fly ash particles, and enter the interior void. The time needed to fill the interior voids of the fly ash particles to the desired extent with sodium may depend largely upon the temperature of the sodium vapor, the thickness of the fly ash particle walls (i.e., the diffusion length), the fly ash material, and other parameters. In general, higher temperatures may be used to increase the permeation rate. The flow of vaporized sodium may be continued until the voids of the fly ash particles have filled to a desired extent. After at least partially filling the interior voids with sodium, the flow of sodium vapor may be stopped. The microparticle may be cooled to trap the sodium inside the interior void. The sodium within the interior may solidify to form solid sodium metal within the interior. The solid sodium may exist as a solid deposit on the interior walls, a crystallite within the interior, or a conglomerate of sodium metal within the interior. The sodium may provide additional strength and integrity to the fly ash particle.

As another illustrative example, consider permeating lithium into the internal void of a fly ash particle. Lithium has a relatively small size and weight. This allows for high percentages by weight hydrogen storage in lithium hydride and allows lithium to diffuse and permeate materials relatively rapidly. Lithium has a melting point of approximately 180° C. and a boiling point of approximately 1347° C. If the fly ash particle has a melting point temperature that is not much greater than 1000° C. the lithium may be heated to a temperature of approximately 500-950° C. At this temperature the lithium will exist as a liquid. Fly ash particles may be added to the liquid. The lithium will contact the walls of the fly ash particles, begin to permeate the walls of the fly ash particles, and enter the interior void. Often, the permeation will continue until the void has been substantially filled with lithium, although this is not required. After at least partially filling the interior void with lithium, the fly ash particles may be removed from the liquid lithium. Filtering, centrifugation, or other approaches known in the arts may be used. The fly ash particles may be cooled to trap the lithium inside the interior void. The lithium within the interior may solidify to form solid lithium metal within the interior. The solid lithium may exist as a solid deposit on the interior walls, a crystallite within the interior, or a conglomerate of lithium metal within the interior. The lithium may provide additional strength and integrity to the fly ash particle. Of course, it will be appreciated that some fly ash particles, depending upon how they are formed, may have a melting point temperature that is greater than the boiling point temperature of lithium. Such fly ash particles may be filled by permeation resulting from contact with either liquid or vapor lithium.

As desired, hydrogen storage materials remaining on the outside of the microparticles may be removed. One method of removal involves contacting the particles with a heated liquid or gas having a temperature greater than the melting point temperature of the hydrogen storage material so that the external material is stripped away with the flow. Alternatively, if the boiling point temperature of the hydrogen storage material is less than the melting point temperature of the microparticle, another method for removing the exterior hydrogen storage material may involve rapidly heating the container to above the boiling point temperature of the hydrogen storage material in order to vaporize the hydrogen storage material. The vapor may be swept away with an inert carrier gas, such as nitrogen, argon, or others known in the arts. The microparticle may be cooled before significant back-permeation of the hydrogen storage material out of the interior void. Alternatively, the hydrogen storage material may be left on the outside walls of the microparticle in order to provide additional hydrogen storage capacity.

The hydrogen storage material permeated into the interior void of a hydrogen permeable container or microparticle may be charged with hydrogen by permeating hydrogen across the walls of the container or microparticle and combining the hydrogen with the hydrogen storage material. For example, the lithium filled fly ash particles may be charged with hydrogen by exposing them to hydrogen at elevated temperature and pressure. Often, the temperature will be high enough to achieve a sufficiently high permeation rate of hydrogen, but not so high that the hydrogen storage material will permeate out of the interior void. For glass microspheres, conventional charging temperatures, or lower, may be used. Relatively lower temperatures may be used for relatively longer periods of time or relatively higher temperatures may be used if a rapid charging rate is desired. The amount of time needed to charge the particles is not a limitation of the invention. In embodiments of the invention a temperature in the range of approximately 100-400° C. may be used. At this range of temperature the container may become sufficiently permeable to hydrogen that the material therein may be converted to hydride. The pressure of hydrogen may be one atmosphere, or higher, but not so high that the pressure would damage the fly ash particles. The hydrogen may contact the walls of the fly ash particles, permeate the walls, enter the interior void, and combine with the hydrogen storage material contained therein. As an example, the hydrogen may combine with lithium to form lithium hydride (LiH) which contains approximately 13% by weight hydrogen.

As desired, a catalyst may be formed on the exterior of the fly ash particles to catalyze charging and/or de-charging the cenospheres with hydrogen. Suitable catalysts include hydrogenation and dehydrogenation catalysts commonly used in the arts including the dopants commonly used in metal hydride hydrogen storage materials to increase hydrogen recovery kinetics or reduce hydrogen recovery temperature. In embodiments of the invention an aluminum-zirconium catalyst may be deposited on the cenosphere exterior with a plasma spray or other spray process. Other catalysts are disclosed the copending U.S. Provisional Patent Application 60/395,013, entitled "Improved Methods For Hydrogen Storage Using Doped Alanate Compositions" by Craig M. Jensen and Scott D. Redmond and filed on Jul. 10, 2002.

Hydrogen may be recovered from the container by heating the hydrogen storing material within the container and permeating the thermally freed hydrogen out of the container. The hydrogen storage material may be heated to a temperature sufficient to recover hydrogen, or sufficient to provide the desired hydrogen permeability, whichever is greater. As an example, lithium hydride may be heated within an interior void of a fly ash particle in order to free hydrogen from the hydride and permeate the hydrogen out of the fly ash particle. The presence of the lithium within the fly ash particles may help to reduce the pressure within the interior void during hydrogen recovery. This may help reduce the susceptibility of the particles to cracking and may help avoid many of the prior art structural and mechanical problems that have been encountered in using glass microspheres for hydrogen storage.

B. Containers Having An Enclosing Layer Formed Over A Hydrogen Storage Material

In alternate embodiments of the invention, a micro-sized hydrogen permeable container having a hydrogen storage material contained therein may include a hydrogen permeable enclosing layer formed or coated over a hydrogen storage (or storing) material. The hydrogen storage material may comprise a particle containing a metal that is capable of combining with hydrogen to form a metal hydride. The enclosing layer may encapsulate or surround the particle and contain a protective material such as an oxide of a metal, an oxide of silicon (e.g., silica), an oxide of aluminum (e.g., alumina), a nitride of a metal, boron nitride, titanium nitride, hydrogen permeable membrane materials, or related materials. The enclosing layer may be sufficiently permeable to hydrogen, at least when heated, to allow thermally recovered hydrogen to permeate out of the container for collection. The invention of embodiments encompasses a method of forming a hydrogen storing material within the micro-sized hydrogen permeable container by enclosing a particle containing a hydrogen storage material with a layer that is permeable to hydrogen at least when heated. The particle may be formed, for example by condensation of a thermal spray, and then the enclosing layer may be formed over the surface of the particle, for example by condensing the protective material over the surface of the particle.

Initially, a particle of a hydrogen storage material may be formed. A gas phase condensation process, thermal spray process, or plasma spray process may be used to form the particle. Such approaches offer a number of advantages as previously discussed. If a small particle is desired, these approaches may be used to form nanoparticles and microparticles. Such particles have a large percentage of their material at the surface instead of concealed within the bulk and may allow easier, lower temperature, and more complete hydrogen recovery. Other approaches that are suitable for forming the particles include sonochemical processing, cavitation processing, microemulsion processing, mechanical crushing and grinding, high-energy ball milling, and other nanoparticle synthesis techniques. The particle of embodiments may comprise the hydrogen storage nanoparticle 120 shown in FIG. 1. Greater than micro-sized chunks of a metal may be crushed and ground in a ball grinding apparatus in order to form micro-sized particles. The size of the hydrogen storage particle is not a limitation of embodiments and particles larger than the micro-sized range may be used, although the inventors presently favor micro-sized or smaller particles. The particle of embodiments may comprise a microparticle support with a hydrogen storage material deposited thereon, such as shown in FIG. 4. As desired, the hydrogen storage material of the particles may be converted to a hydrogen storage material. The particles may be exposed to hydrogen to cause their hydrogen storage material to combine with hydrogen. This may help to stabilize the particles.

After forming the hydrogen storage or hydrogen storing particles, the particles may be enclosed with a layer that is permeable to hydrogen, at least when heated. The particles may be coated or covered with an enclosing layer containing a protective material such as an oxide of a metal, an oxide of silicon (e.g., $SiO_2$), an oxide of aluminum (e.g., $Al_2O_3$), diamond, a nitride of a metal, boron nitride, titanium nitride, etc. Other suitable materials include materials commonly used for hydrogen permeable membranes for hydrogen separation. An example hydrogen-permeable metal membrane is disclosed in U.S. Pat. No. 6,152,995 to Edlund. An example hydrogen purification membrane containing vanadium alloyed with at least 1-20 atomic percent nickel and/or 1-20 atomic percent cobalt and/or 1-20 atomic percent palladium is disclosed in U.S. Pat. No. 6,395,405 to Buxbaum. One exemplary hydrogen purification membrane disclosed comprises a metallic substrate having a coating, the coating comprising palladium and a surface species present as discontinuous surface deposits, the surface species selected from the group consisting of alkali metal cations, alkaline earth elements and alkaline earth cations. ZnS film membranes on glass supports have also been used as hydrogen separation membranes and introduce an n-type semiconductor character that may favor chemisorption of hydrogen. Other hydrogen permeable membranes abound in the literature. Non-limiting examples of such membranes include palladium membranes, tantalum membranes, palladium-coated ceramic support, perovskite materials, hydrogen permeable silicalite-1 molecular sieve materials, and other hydrogen permeable materials. These hydrogen separation membrane materials may allow forming a hydrogen selective layer that is substantially more permeable to hydrogen than to oxygen, nitrogen, and other primary components of air. Any of these materials may potentially be used to enclose the hydrogen storage material.

The layer may envelop or encapsulate the particle as an outer protective shell surrounding the outer surface of the particle. The enclosing layer may provide mechanical and/or chemical protection to the particle. As an example, the enclosing layer may prevent or at least reduce reaction of a metal hydrogen storage material when the particle is exposed to air or moisture. A range of thickness for the enclosing layer may be appropriate depending upon the particular amount of protection desired for the particle, and the particular hydrogen permeability desired for the layer. In general, thicker layers may provide greater protection and lower permeability to hydrogen compared to thinner layers. The enclosing layer should be sufficiently permeable to hydrogen, at least when appropriately heated, to allow recovery of hydrogen from the particle and/or charging the particle with hydrogen.

In one aspect the enclosing layer may comprise a catalyst that increases the kinetics of hydrogen charging and/or recovery. The catalyst may comprise aluminum, zirconium, titanium, or some combination as part of the enclosing layer deposited for example with a thermal spray process. Other catalysts are disclosed in copending U.S. Provisional Patent Application 60/395,013, entitled "Improved Methods For Hydrogen Storage Using Doped Alanate Compositions" by Craig M. Jensen and Scott D. Redmond and filed on Jul. 10, 2002.

Different approaches may be used to form the enclosing layer over the particle. The present inventors contemplate forming the enclosing layer by condensing a thermal spray (e.g., a plasma spray). In some embodiments of the invention, a hydrogen storage particle formed by any particle formation approach known in the arts may be introduced into a thermal spray containing a protective material to allow the spray to condense on the exterior of the particle and form the enclosing layer. As an example, the particle may be introduced into the thermal spray with the use of a collision gas or may be directly adding the spray from a powder port or hopper. In other embodiments of the invention, a particle containing a hydrogen storage material having a relatively high condensation temperature may be formed initially by cooling a thermal spray and then the particle may be enclosed in the layer of a protective material having a lower condensation temperature by further cooling the thermal spray to cause the protective material to condense on the exterior of the particle and form the enclosing layer.

Of course it is not required to form the enclosing layer by condensing a thermal spray. Other deposition processes known in the arts may be used. Many chemical vapor deposition (CVD) and physical vapor deposition (PVD) processes known in the arts may be used. CVD involves depositing a layer on a surface through a chemical reaction occurring in a gas over the surface. CVD processes for depositing silicon dioxide, doped silicon dioxide (e.g., phosphosilicate glass, borophosphosilicate glass, etc.) are commonly used in the semiconductor processing arts. PVD involves depositing a material from a source to the surface of the particle without changing the chemical composition of the material. Commonly used physical vapor depositions include among others sputtering and thermal evaporation. PVD may be used to deposit materials such as silica, alumina, glass, boron nitride, and others.

IV. Storage Systems For Hydrogen Storage Materials

A. Cassettes

According to some embodiments of the invention a hydrogen storage material or composition as described herein may be added to a cassette. The cassette will refer to a container for a hydrogen storage material that allows for improved handling of the hydrogen storage material during distribution and that may be loaded and unloaded into a hydrogen recovery system. Exemplary cassettes that may be used to contain the hydrogen storage materials disclosed herein include those Disclosed in copending U.S. patent application Ser. No. 10/241125, entitled "Hydrogen Storage, Distribution, And Recovery System" by Scott D. Redmond and filed on Sep. 10, 2002. The U.S. patent application Ser. No. 10241125 is hereby entirely incorporated by reference.

B. Rail Cars

Figure 7:
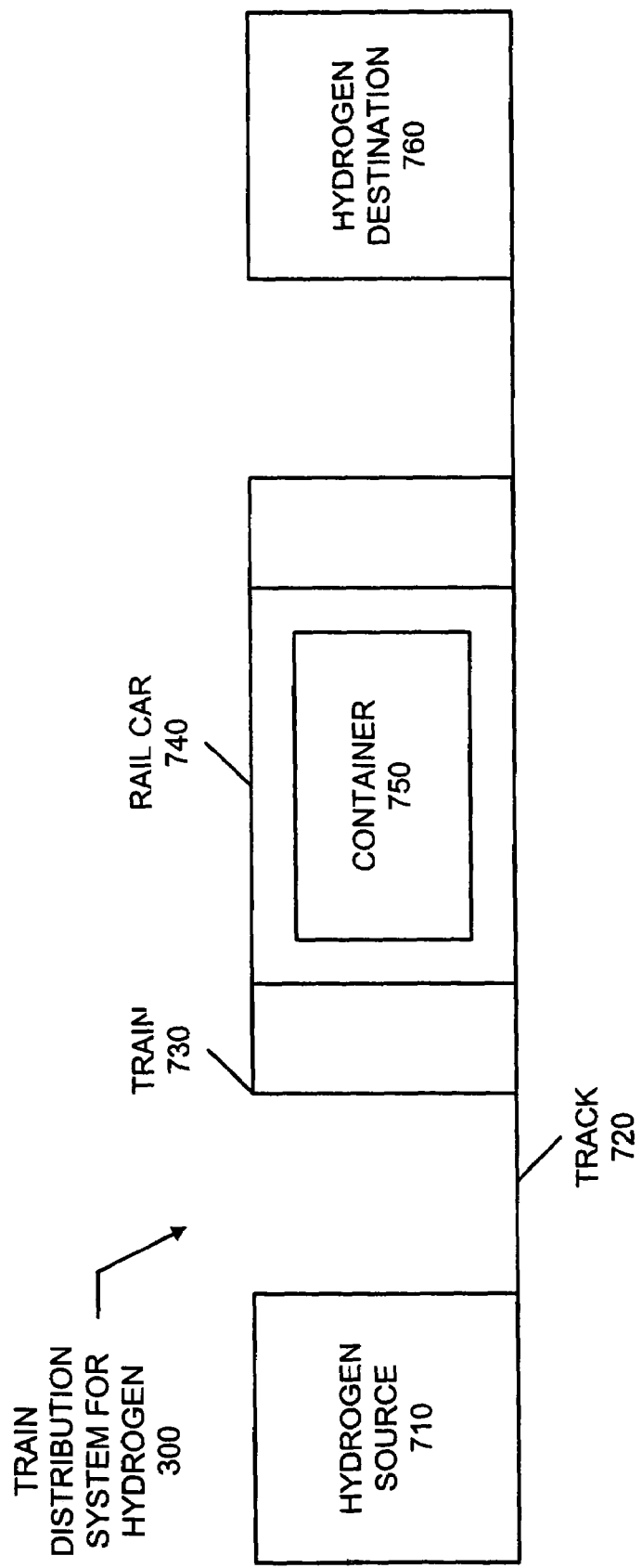
FIG. 7 shows a train distribution system for hydrogen that contains a track connecting a hydrogen source to a hydrogen destination and a train on the track that contains a rail car having a hydrogen storage material or hydrogen storing material container therein, according to embodiments of the invention.

FIG. 7 shows a train distribution system for hydrogen 700 that contains a track 720 connecting a hydrogen source 710 to a hydrogen destination 760 and a train 730 on the track that contains a rail car 740 having a hydrogen storage material or hydrogen storing material container 750 therein, according to embodiments of the invention. The train and the rail car containing the material may move along the track between the source and the destination in order to distribute hydrogen from the source to the destination.

The hydrogen source may be a source of hydrogen that may be used to charge material in containers with hydrogen. For example, the hydrogen source may contain a hydrogen generation plant (e.g., a reformer or electrolyzer) that may be used to generate hydrogen used to charge a spent or depleted hydrogen storage material within the container. The hydrogen source may also comprise a pressurized vessel containing hydrogen. Alternatively, the hydrogen source may be a source of containers having fully charged hydrogen storing material such as metal hydride. In this aspect, the hydrogen source may represent any conventional warehouse, or train loading station where these containers may be introduced into the rail car.

The rail car 740 contains the container 750 and may contain any desired number of other containers. One or a plurality of hydrogen storage material containers may fit snugly within a standard sized rail car so that they utilize most of the available storage space within the rail car. The container 750 contains a hydrogen storage material or hydrogen storing material, depending upon whether the material is charged with hydrogen. The material may be one of the materials disclosed herein, although this is not required. As an example, the material may include a hydrogen storage or storing composition containing a hydrogen storage nanomaterial, a micro-sized support having a hydrogen storage deposit, or a micro-sized hydrogen permeable container having a hydrogen storage material therein. Alternatively, the train car may contain other hydrogen storage or storing materials known in the arts. Other materials that are suitable include but are not limited to other metal hydrides, carbon nanostructures, glass microspheres, and other solid-state materials for hydrogen storage that are known in the arts. These materials may be in a hydrogen-charged or hydrogen-uncharged state, depending upon whether they are coming from the hydrogen source or returning from the hydrogen destination. As desired, the rail car may be lined with a material compatible with hydrogen and the hydrogen storage material, although this is not required.

In any event, the train receives the hydrogen and may move along the track to the hydrogen destination. The train comprises a connected line of a plurality of rail cars either with, or without, a locomotive. It is appreciated that in an alternate embodiment (not shown) the rail car 740 may be propelled along the track individually by a self-contained motor, instead of as a part of the train 730. The track may be of any desired length and may contain a line of rails affixed to ties laid on a roadbed. The track allows the rail car to convey hydrogen from proximate the source 710 to proximate the destination 760. Hydrogen may be added to or removed from the container in situ in the rail car. Examples of hydrogen destinations include but are not limited to pressurized vessels for storing hydrogen, buffer tanks, cassette charging stations, hydrogen powered power plants, fuel cells, and other hydrogen utilization systems. Once at the destination, the hydrogen may be recovered from the car by heating or other techniques known in the arts.

Figure 8:
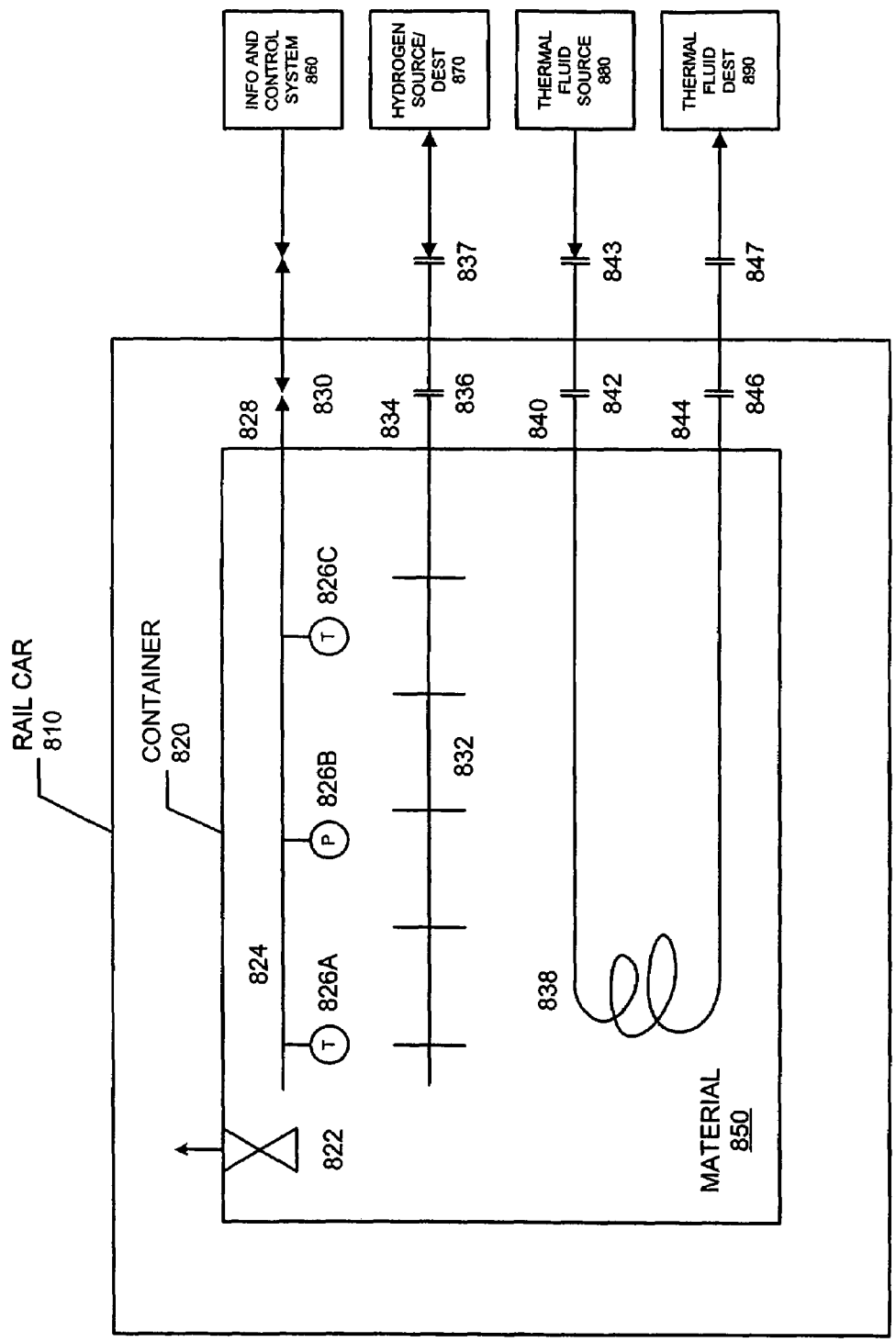
FIG. 8 shows a rail car having a container for a hydrogen storage or storing material therein, according to embodiments of the invention.

FIG. 8 shows a rail car 810 having a container 820 for a hydrogen storage or storing material therein, according to embodiments of the invention. The rail car and the container comprise a new and useful hydrogen storage, distribution, and recovery system of the present inventors. The container 820 has a hydrogen storage or storing material 850 contained therein, a pressure relief valve 822 to relieve an excessively high pressure within the container, an instrumentation and control line 824 to connect a plurality of measurement devices 826A-C to an information and control system 8860, a hydrogen collection and distribution system 832 to collect hydrogen recovered from the material 850 for removal from the container and to distribute hydrogen that is added to the container to the material 850, and a thermal fluid distribution system 838 to distribute a thermal fluid to different portions of the material 850.

Hydrogen may be exchanged between the container 820 and an appropriately connected hydrogen source/destination 870. The container has a hydrogen port 834 that may be connected with a hydrogen conveyance system 837 of the rail car. The hydrogen port may include piping connected with the hydrogen collection and distribution system that ends in an interface 836 that may be connected with a corresponding interface of the hydrogen conveyance system 837 of the rail car. The hydrogen conveyance system of the rail car may include piping that may be connected with both the hydrogen port 834 at the interface 836 and piping of the hydrogen source/destination 870 at the interface 835. In the illustrated embodiment, the connections of the container and the hydrogen source/destination to the rail car are made with flanges at the interfaces, although this is not required. Other connectors known in the arts may also be used.

The illustrated container 820 has the internal hydrogen collection and distribution system 832 coupled with the hydrogen port 834 to facilitate collection and distribution of hydrogen, although this system is not required. In particular, hydrogen may be recovered from the material, often by heating the material, and removed from the container to a connected hydrogen destination 870, and hydrogen may be added to the container from a connected hydrogen source 870 and combined with the material within the container to form a hydrogen storing material (e.g., a metal hydride or a hydrogen filled glass microsphere). The hydrogen collection and distribution system may include conventional piping, along with any desired flow regulation devices (e.g., valves, flow control valves, check valves, flow controllers, etc.), and metering devices (e.g., flow meters, pressure meters, temperature meters, etc.). The flow regulation and metering devices may be inside the container, or outside the container. The flow of hydrogen may be regulated under manual and/or automatic control. The hydrogen collection and distribution system may help to collect hydrogen from the material during recovery and distribute hydrogen to the material during charging. The system may include a manifold containing an array of piping, tubing, ducts, gaps, or other void space that is dispersed through different volumes of material within the car and having vents for flow of hydrogen. The vent of one embodiment includes openings in a pipe covered by a fabric, wire mesh, porous ceramic material, or other screening device sufficient to allow flow of hydrogen gas while blocking flow of the material 850 from the container. The system may also include a generally porous medium or packing in which the material 850 is distributed.

Often, the material 850 will be heated to recover hydrogen. This may be accomplished in numerous ways including by using electrically resistive heaters (e.g., heating coils), thermal fluids, contact heaters, etc. In the illustrated embodiment, the container includes the thermal fluid distribution system 838 to heat the material 850 to recover hydrogen for delivery to the hydrogen destination 870, although this is not required. The distribution system may be used to distribute a thermal fluid, either a heating fluid, or a cooling fluid, or both a heating fluid and a cooling fluid, to the material. The thermal fluid may be a hot gas (e.g., steam, hot air, etc.), a hot liquid (e.g., hot water, hot oil, etc.), a cold gas (e.g., cold refrigeratant gas, cold air, etc.), a cold liquid (e.g., cold refrigerant liquid, cold water, etc.). The distributor may include an array or coil of pipes dispersed within the hydrogen storage material to convey the fluid.

Thermal fluid may be exchanged between the thermal fluid source 880, the container 820, and the thermal fluid destination 890 in order to heat and/or cool the material 850 within the container. The container has a thermal fluid inlet port 840, and a thermal fluid outlet port 844 that may be connected with corresponding ports of a thermal fluid conveyance system 843, 847 of the rail car at interfaces 842, 846. The inlet and outlet ports may include piping connected with the thermal fluid distribution system 838 that ends in an interface 842, in this case a flange, which connects to the thermal fluid conveyance system of the rail car. The thermal fluid conveyance system 843, 847 may include piping that may be connected with the inlet and outlet ports of the container at the interfaces 842, 846 and the thermal fluid source and destinations at the interfaces 841 and 845, respectively. The illustrated connections are through flanges, although this is not required.

In the particular illustration a single distributor 838 may be used for distributing both heating fluids and cooling fluids. If heating the material is desired, for example in order to recover hydrogen, hot water from a hot water source 880, such as the outlet of the heating side of a heat exchanger, may be pumped through the inlet port 840, and resulting cooled water may be pumped through the outlet port 844 to a destination 890, such as the inlet of the heating side of the heat exchanger. The heat supplied by the heat exchanger may come from the train boiler, furnace, exhaust, or any other desired source. If cooling the material is desired, for example to slow hydrogen recovery or to remove heat during charging with hydrogen, cold water from a cold water source 880, such as the outlet of the cooling side of a heat exchanger, may be pumped through the inlet port 840, and resulting heated water may be pumped through the outlet port 844 to a destination 890, such as the inlet of the cooling side of the heat exchanger. Of course in other embodiments of the invention separate fluid distributors may be used for heating fluids and cooling fluids.

The container includes the instrumentation and control line 824 and the plurality of measurement devices 826A-C. The illustrated container includes two temperature measurement devices 826A and 826C at different locations and a pressure measurement device 826C, although this is not required. Any conventional temperature and pressure measurement devices known in the arts may be used. Signals containing information associated with temperature, pressure, or other conditions within the container may be conveyed between the container and an appropriately connected information and control system 860. The information and control system may reside in the container, the rail car, the train, or at any other desired location. In the illustrated embodiment, the container has a signal port 828 that may be connected with a signaling medium 831 of the rail car. Conventional wiring or lines used for instrumentation may be used for the line 824 and the signaling medium. The signal port and the signaling medium may meet at a conventional electrical connection interface 830. The signaling medium may convey the signals, for example representing temperature and pressure within the container, to an external information and control system 860. The information and control system may be located in the engineers main control panel of the train, although this is not required. In alternate embodiments of the invention, the connection may be a wireless connection. The container may have a wireless communication device, a telemetry device, or the like to wirelessly communicate information to the information and control system.

In the illustrated embodiment, the container 820 is connected to the information and control system 860, the hydrogen source/destination 870, the thermal fluid source 880, and the thermal fluid destination 890 through signaling medium 831, hydrogen flow conveyance system 837, and thermal fluid conveyance system 843, 847 of the rail car, although this is not required in other embodiments of the invention. Those having an ordinary level of skill in the art and the benefit of the present disclosure will appreciate that, in alternate embodiments of the invention, the container may be directly connected to the information and control system, the hydrogen source/destination, thermal fluid source, and the thermal fluid destination. For example, the rail car may have openings in its housing that allow piping and electrical lines to pass through to form these connections.

Thus, improved hydrogen storage materials have been described. Although described with reference to specific embodiments it should be remembered that various modifications and changes may be made to the techniques described herein without departing from the broader spirit and scope of the invention. With respect to the above description then, it is to be realized that the parts of the invention are to include variations in size, materials, shape, form, function and manner of operation, assembly and use, as are deemed readily apparent to one of ordinary skill in the art, and all equivalent relationships to those illustrated in the drawings and described in the specification are intended to be encompassed by the present invention. The specification and drawings are accordingly to be regarded in an illustrative rather than a restrictive sense and the invention measured only in terms of the claims, which follow.

What is claimed is:

1. A composition comprising a micro-sized support having a hydrogen storage material deposited thereon, wherein:
   (i) the hydrogen storage material deposited on the support comprises a thermal spray deposit;
   (ii) the hydrogen storage material comprises a metal that is capable of combining with hydrogen to form a metal hydride;
   (iii) the thermal spray deposit comprises a plasma spray deposit; and
   (iv) the support comprises a fly ash particle having a substantial internal void.

2. A composition comprising a micro-sized hydrogen permeable container having a hydrogen storage material contained therein, wherein the container comprises an enclosing layer containing a protective material selected from the group consisting of silica, alumina, boron nitride, and a combination thereof, formed over a particle containing a metal hydrogen storage material that is capable of combining with hydrogen to form a metal hydride.

3. A method comprising forming a hydrogen storage material within a micro-sized hydrogen permeable container by permeating the hydrogen storage material into the container, wherein forming comprises permeating lithium into a substantial internal void of a fly ash particle.

4. A composition comprising a micro-sized hydrogen permeable container containing a hydrogen storage material formed therein by the method of claim 3.

5. A method comprising forming a hydrogen storage material within a micro-sized hydrogen permeable container by enclosing a particle containing the hydrogen storage material with a layer that is permeable to hydrogen when heated, wherein enclosing the particle comprises condensing a thermal spray over a surface of the particle.

6. The method of claim 5, further comprising forming the particle from a thermal spray.

* * * * *